Figure 2:
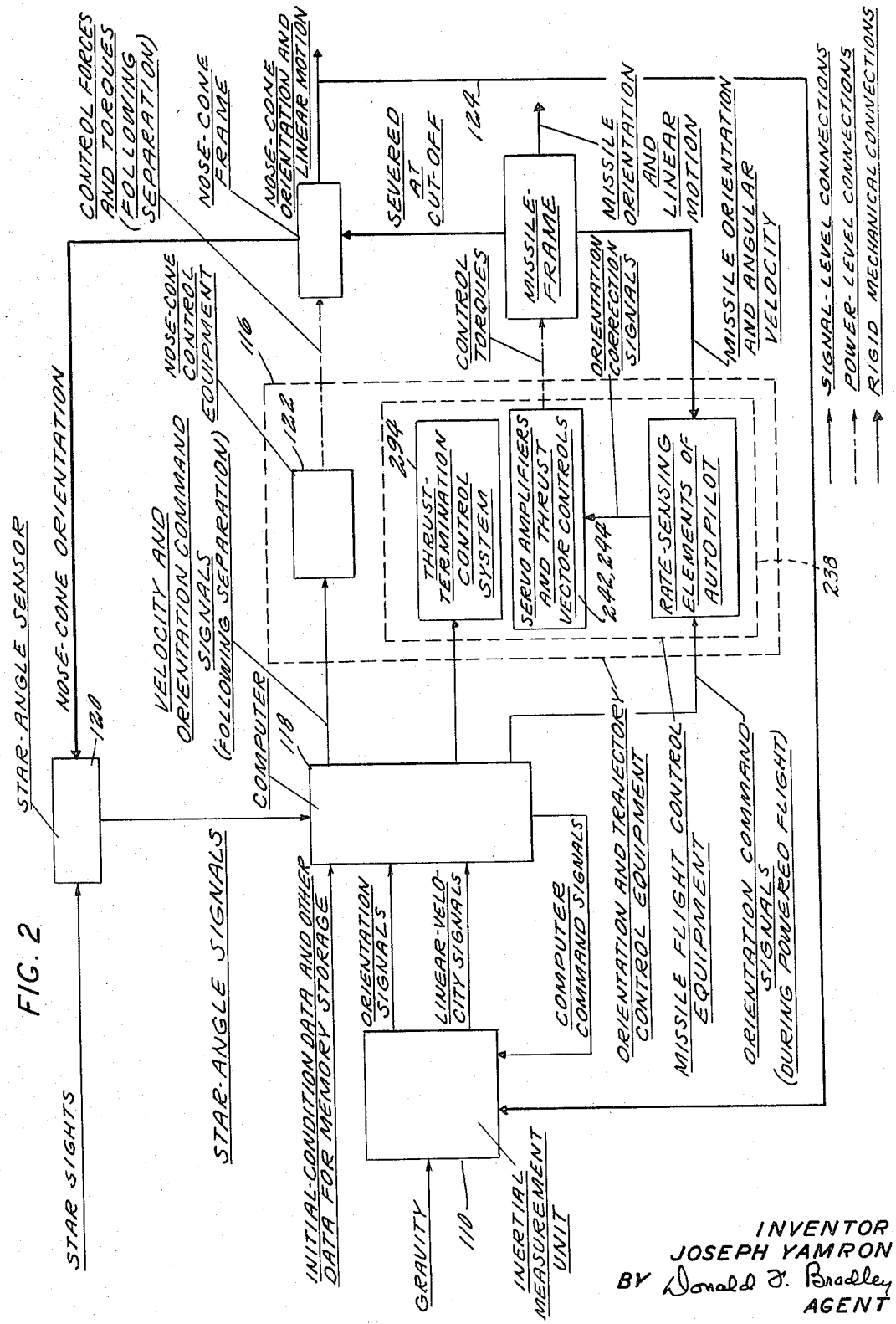

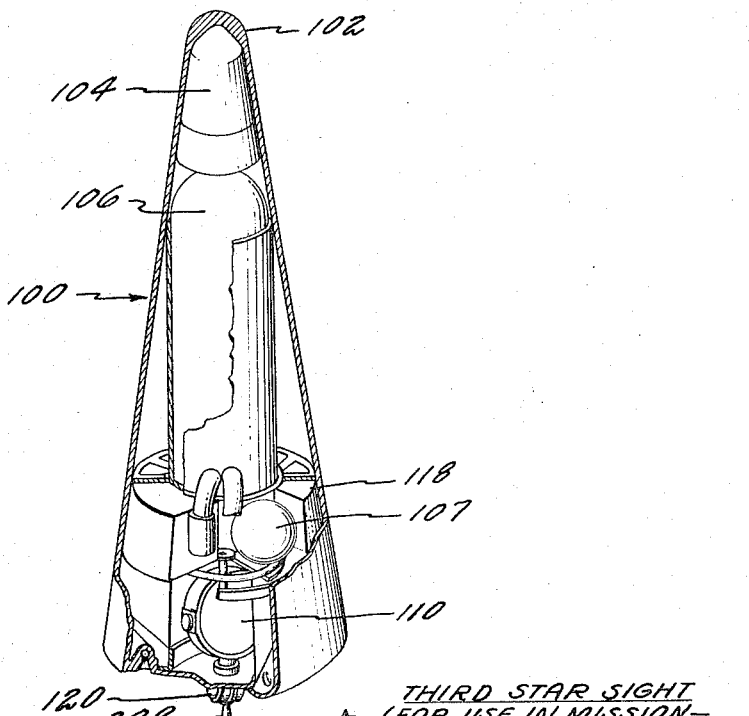
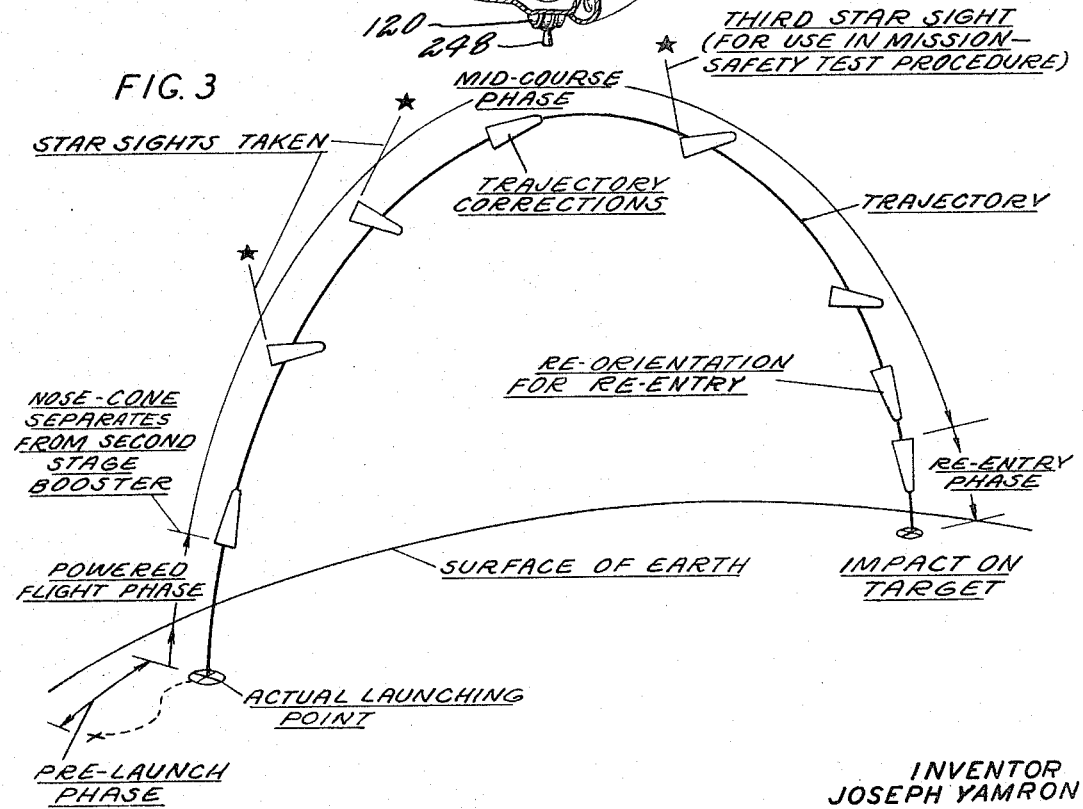

INVENTOR
JOSEPH YAMRON
BY Donald J. Bradley
AGENT

INVENTOR
JOSEPH YAMRON
BY Donald F. Bradley
AGENT

Jan. 31, 1967   J. YAMRON   3,301,508
GUIDANCE SYSTEM WITH STELLAR CORRECTION
Filed June 7, 1961   15 Sheets-Sheet 4

INVENTOR
JOSEPH YAMRON
BY Donald F. Bradley
AGENT

INVENTOR
JOSEPH YAMRON
BY Donald J. Bradley
AGENT

INVENTOR
JOSEPH YAMRON
BY Donald J. Bradley
AGENT

FIG. 10
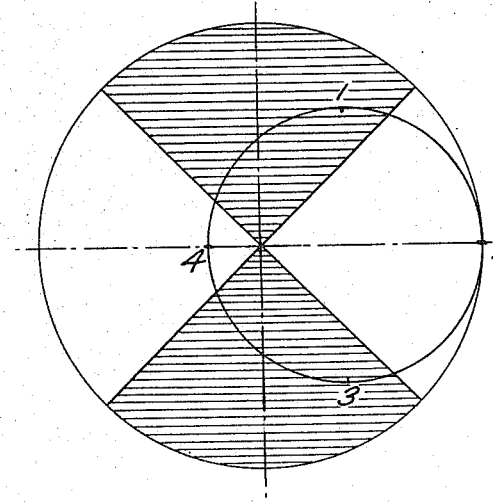
CENTER LINE OF
TRANSMITTING PORTION
(PARALLEL TO NOSE-CONE
ROLL AXIS)
(a) RETICLE GEOMETRY
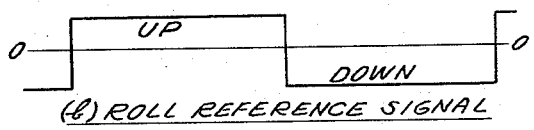
(b) ROLL REFERENCE SIGNAL
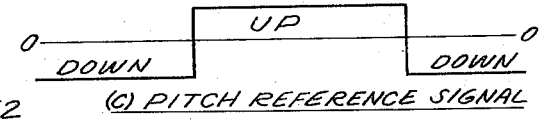
(c) PITCH REFERENCE SIGNAL
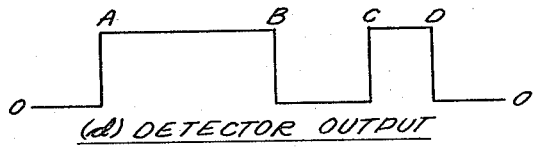
(d) DETECTOR OUTPUT
(e) PARAMETRIC-AMPLIFIER
OUTPUT
INVENTOR
JOSEPH YAMRON
BY Donald J. Bradley
AGENT 3,301,508
GUIDANCE SYSTEM WITH STELLAR
CORRECTION
Joseph Yamron, West Hartford, Conn., assignor to United
Aircraft Corporation, East Hartford, Conn., a corporation of Delaware
Filed June 7, 1961, Ser. No. 115,867
8 Claims. (Cl. 244—3.18)

This invention relates to a revolutionary, extremely accurate guidance and control system for use in connection with all types of maneuverable bodies and particularly with ballistic missiles. The system, based on the use of proven inertial-guidance techniques, is revolutionary in that it allows a ballistic missile to be launched in ignorance of precise information on launching position or vertical direction and azimuth. For example, this system can provide an accuracy of 0.4 nautical mile for a 5,500 nautical mile flight using present state of the art equipment. By the use of supplementary techniques, as for example map-matching, employed after reentry into the atmosphere, or by improvements in present equipment, this accuracy can be improved to 0.1 nautical mile.

In addition to having excellent applicability to known launch position ballistic-missile operations, precise orbital injection and retrieval from orbit, the guidance and control system of this invention has been specifically designed for use in a mobile ballistic missile system.

The desirability of having highly mobile ballistic missiles as part of our nation's weapon arsenal is well established. The primary advantage of such mobile weapons lies in their being relatively invulnerable to enemy attack. However, with mobility usually comes a decrease in the precision with which the launching position and azimuth can be established. In addition, the alignment procedures and the targeting are more complex for mobile systems. These facts make readily apparent the advantages of any means whereby a ballistic-missile weapon system can be capable of mobile operation and at the same time have its accuracy unimpaired by lack of precise knowledge regarding the launching position and azimuth. The guidance and control system of this invention provides these means.

The basic mobile unit for the missile system may be considered as a transporter-erector-launcher (TEL) containing all personnel and equipment for operating independently of fixed bases for extended periods. For example, a tractor semi-trailer vehicle may carry the missile, returning to the base only for refueling and personnel changes. Upon an enabling signal from command headquarters the TEIL crew can initiate an automatic sequence to erect and fire its missile. However, this invention is not limited to such operation, and may be used effectively for any mobile mode of operation, including launching of the missile from the sea, air, and space platforms.

The ability of the missile to tolerate positional and azimuth uncertainty at launch without degradation of accuracy is achieved through system design features that result in what is termed "launch-in-ignorance" capability. This capability means that just as long as the launching position as determined by the system itself is known to be within a broad area of several hundred square miles that is centered on the actual launching position, and the azimuth is known approximately, the accuracy requirements established for the missile can be maintained.

With a precise measure of time and an inertially-stored vertical, an accurate launch position can be established by use of data obtained from two appropriate star sights, preferably approximately 90° apart. To prevent degradation of the vertical, those sights can be made directly following second-stage separation. Prior to launch the verical can, if necessary, be determined accurately and rapidly on the ground by using guidance system accelerometers only, which thus makes the vertical accuracy independent of launching position.

This vertical, erected and frozen into the inertial measurement unit at the instant of launch, becomes part of the knowledge of the system. As the missile flies, it therefore carries the knowledge of this vertical along with it. Also, data of elapsed time and the accelerations experienced by the missile and measured by the inertial unit are stored in a computer. When the computer program orders sights taken on two predetermined stars in the serene conditions of outer space, those sights are taken in reference to the vertical stored in the system.

Assuming that a sight were ordered after an interval, since celestial distances are so great compared with the small distance the missile has traveled, star sights taken with respect to the vertical stored at launch would be precisely the same as star sights on the same two stars if they had been taken from the Earth at the point of launch. One significant difference is that a sight taken in serene space is a more accurate sight, because it is free from atmospheric aberrations and earth motion errors. Because of the stored vertical, it is possible to take sights at leisure at any point along the flight path. Such sights correspond precisely to sights taken simultaneously from the point of launch at the instant of launch. When a sight is made, the light from the stars should fall exactly in the center of the star angle sensor. The launch position error would then be zero.

If, however, upon looking for the stars in a given position, the sensor finds an angle of discrepancy, another conclusion must be drawn. Measurement of the discrepancy angle indicates that the actual point of launch was some distance away from where it was assumed to be. In other words, the ignorance error and the actual point of launch can be computed. If the present flight path were followed without correction and without further errors, the missile would miss the target by a distance at least as large as the ignorance error. Knowledge of the true launch position combined with the acceleration history taken during flight can be used to compute the present position and velocity. It can also compute the changes necessary to put the payload on the correct trajectory.

Once new and accurate position data has been established by means of star-sight data, the requirements on the guidance and control system call for computation and generation of a velocity increment to correct the trajectory during free flight, and the removal of wind errors following reentry. The required velocity increment may be determined by the computer and applied during free flight by means of simple jet-reaction control equipment. If the removal of wind errors is required, this may be accomplished through the use of an inertial memory and a stored trajectory which has been updated by star-sighting information. Since the inertial guidance system must be located in the nosecone or maneuverable body in order to permit star sighting and error correction after separation, it is convenient to use it during reentry also. The computer and jet-reaction control equipment then provide continuous closed-loop steering until impact.

May-matching may also be used during the terminal phase to further refine the inertial measurements.

Thus, the basic requirements imposed on a guidance and control system by the novel "launch-in-ignorance"

concept are, first, the application, some time after launch, of trajectory corrections based on new and accurate position data, and hence the means for determining such data; and, second, the use of a maneuverable nosecone during free flight, and, for certain applications, during reentry, and hence the means for achieving appropriate control during these portions of the trajectory.

The guidance system of this invention also permits the missile to be launched from a base whose position is known without precise knowledge of azimuth and vertical at launch. By means of minor modifications, well known to those skilled in the art, the missile is capable of being launched immediately after an enemy attack, which may cause maladjustments of the inertial measurement unit, from a fixed base without any requirement for the use of external equipment for determining the rotation of the coordinate system used in the mission and thus realigning and reestablishing the azimuth and vertical. With the known launch position and two star sights the guidance system will, during flight of the missile, compute the actual launch vertical and azimuth and with this data will make the changes required to its present trajectory to intercept the target. While the system will be described in terms of a ballistic missile in which the vertical is known at launch but position and azimuth are not precisely known, it will be understood that the system has the inherent capability of effectively performing the same functions when position is known at launch but azimuth and vertical are not precisely known.

It is, therefore, an object of this invention to provide a novel mobile ballistic missile which will tolerate positional and azimuth uncertainty at launch without degradation of accuracy.

Another object of this invention is to provide a novel guidance and control system.

A further object of this invention is to provide a novel guidance system in which launching position and azimuth are determined after launching of the body.

Another object of this invention is to provide a novel guidance system in which two star sights are taken after launch to correct for launch position uncertainty, or for uncertainty in the coordinate system orientation.

A further object of this invention is to provide a novel guidance system in which the orientation of the coordinate system need not be known at the point of launch.

Another object of this invention is to provide a novel guidance system in which vertical and azimuth are determined after launching.

A further object of this invention is to provide a novel body guidance system in which the target location and the body trajectory may be almost instantaneously changed before launching.

Another object of this invention is a novel guidance system for precisely controlling orbital injection angle and velocity.

Another object of this invention is to provide a novel guidance system in which steering is provided to correct for wind error when the body reenters the Earth's atmosphere.

A further object of this invention is to provide a novel guidance system in which a new trajectory to a target is computed during flight.

Another object of this invention is to provide a novel missile guidance system in which two star sights are taken during flight to provide information of the position, vertical direction and azimuth at the point of launch.

A further object of this invention is to provide a novel missile guidance system in which star sights are utilized to determine the correct heading of the missile.

Another object of this invention is to provide a novel missile guidance system in which a third star sight is utilized to prevent the arming of a warhead if the corrected trajectory is not being followed.

Figure 4:
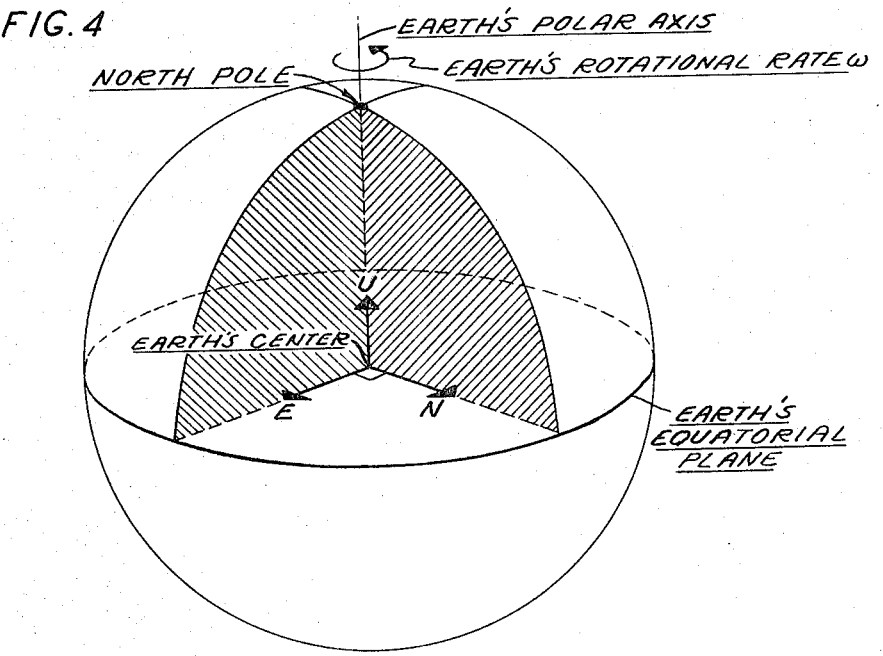
Figure 5:
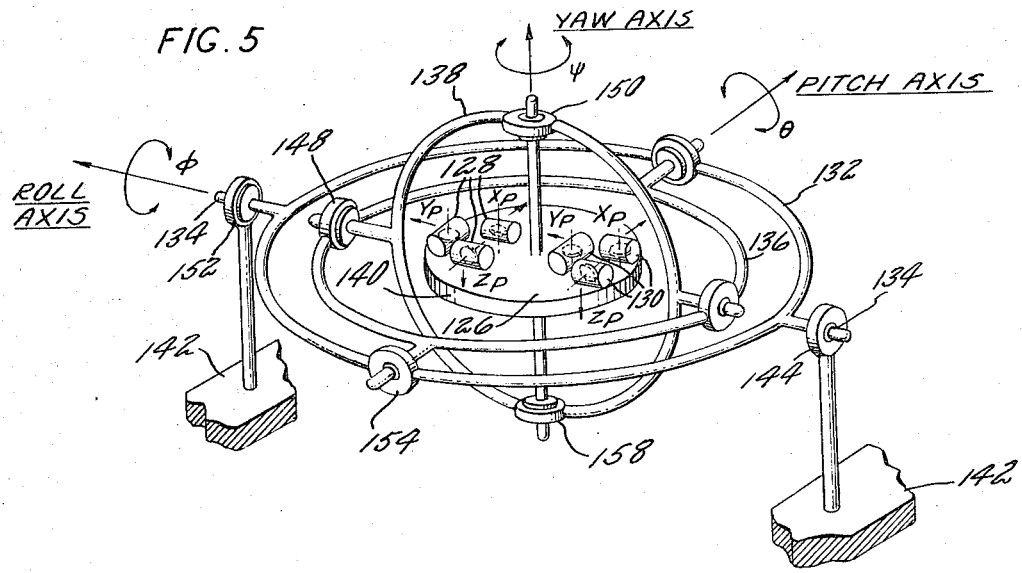
Figure 6A:
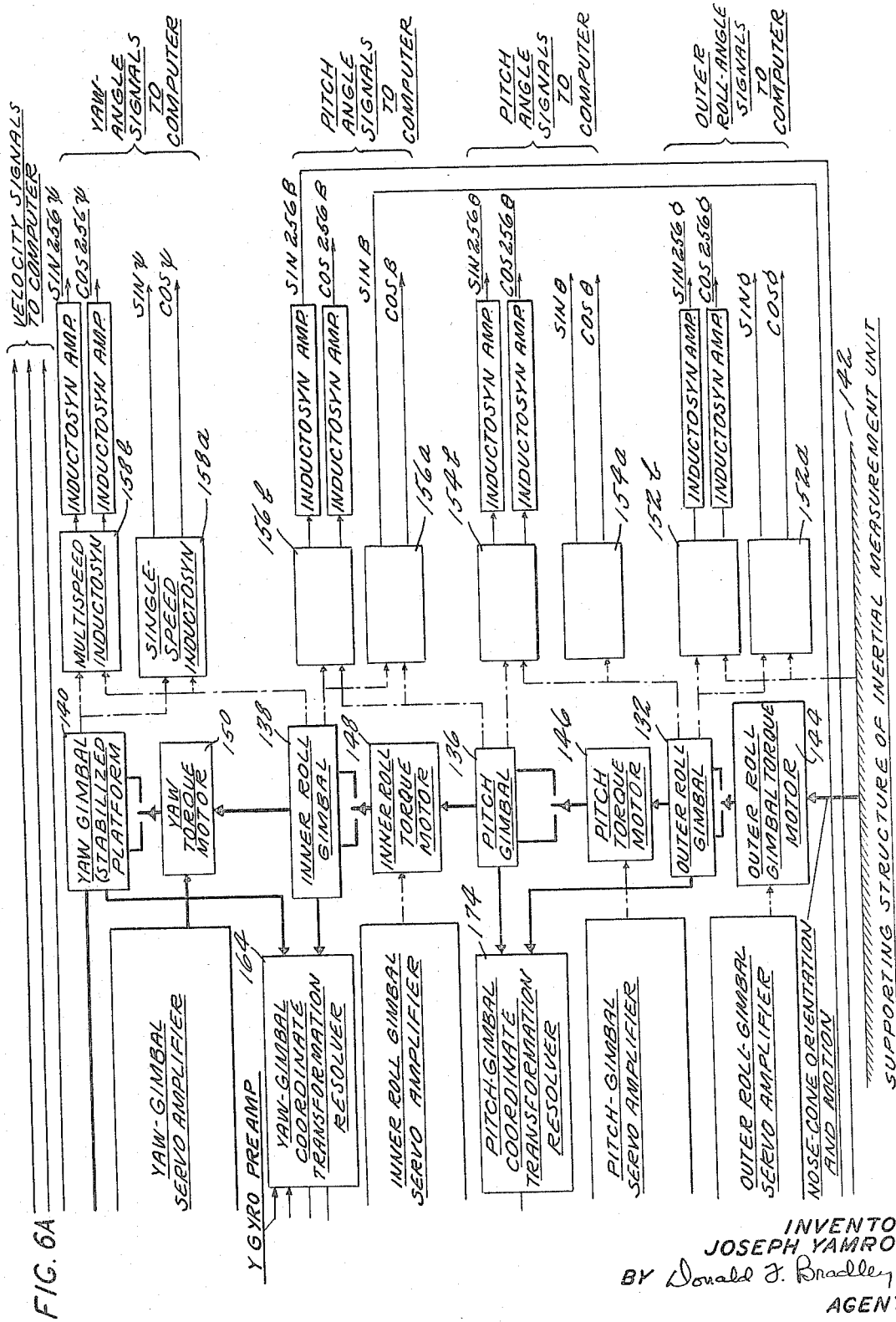
Figure 7:
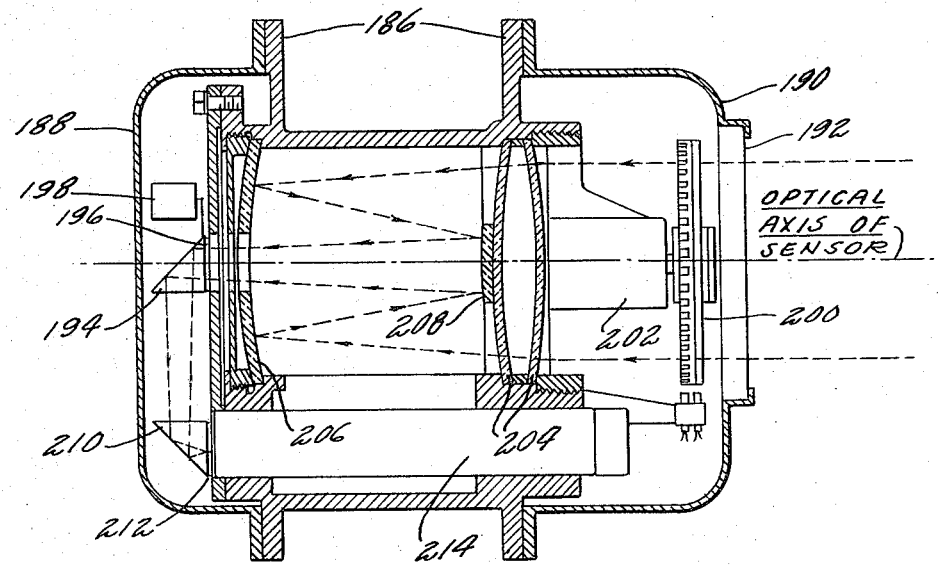
Figure 8:
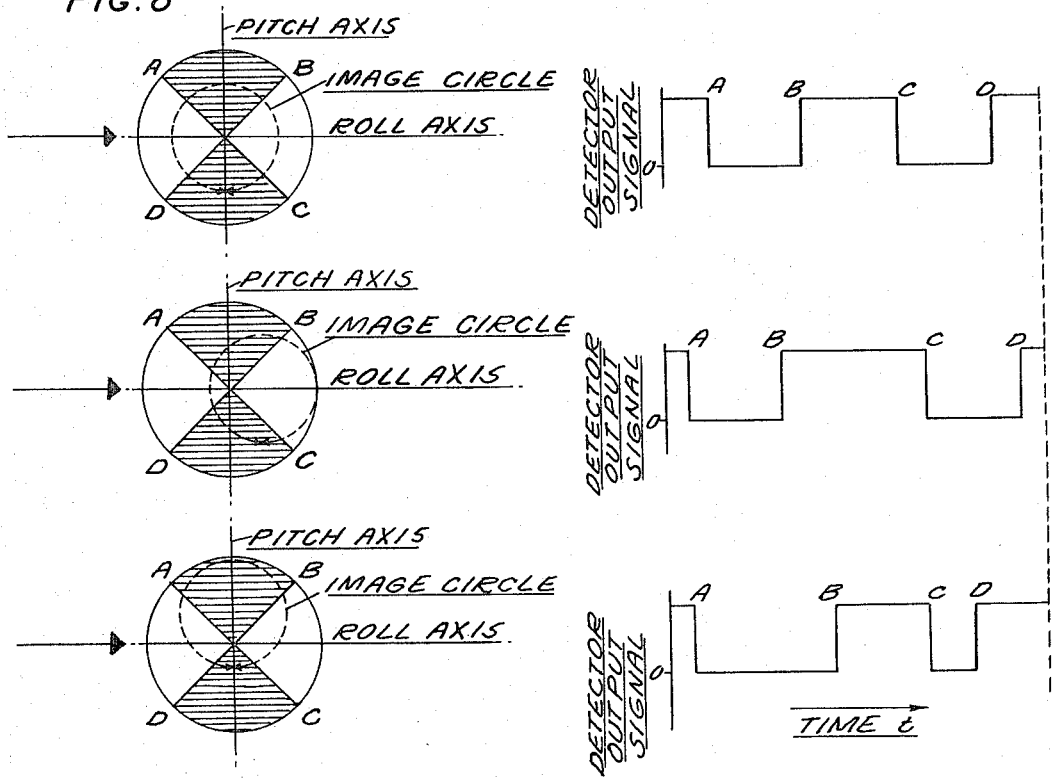
Figure 9:
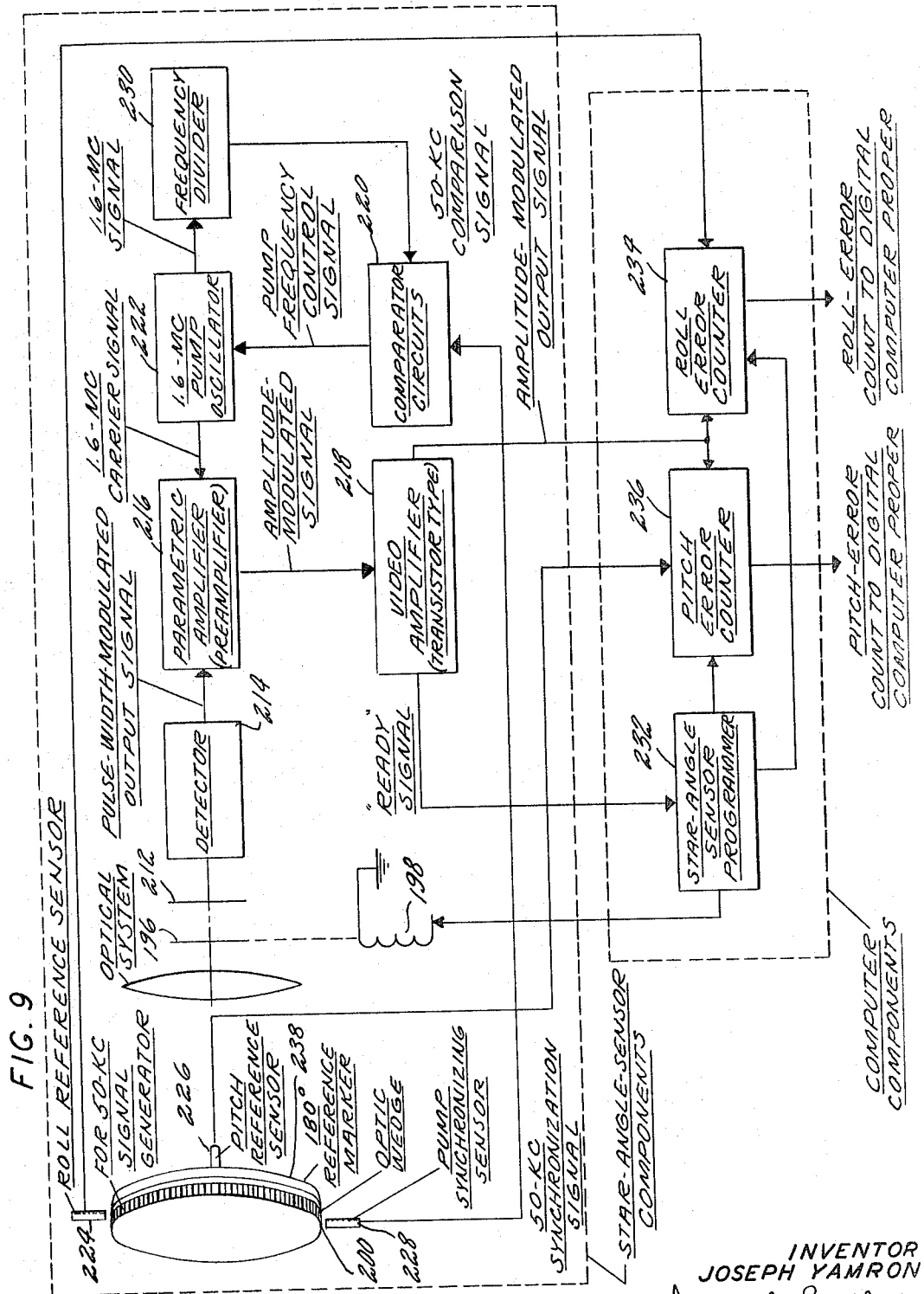
Figure 11:
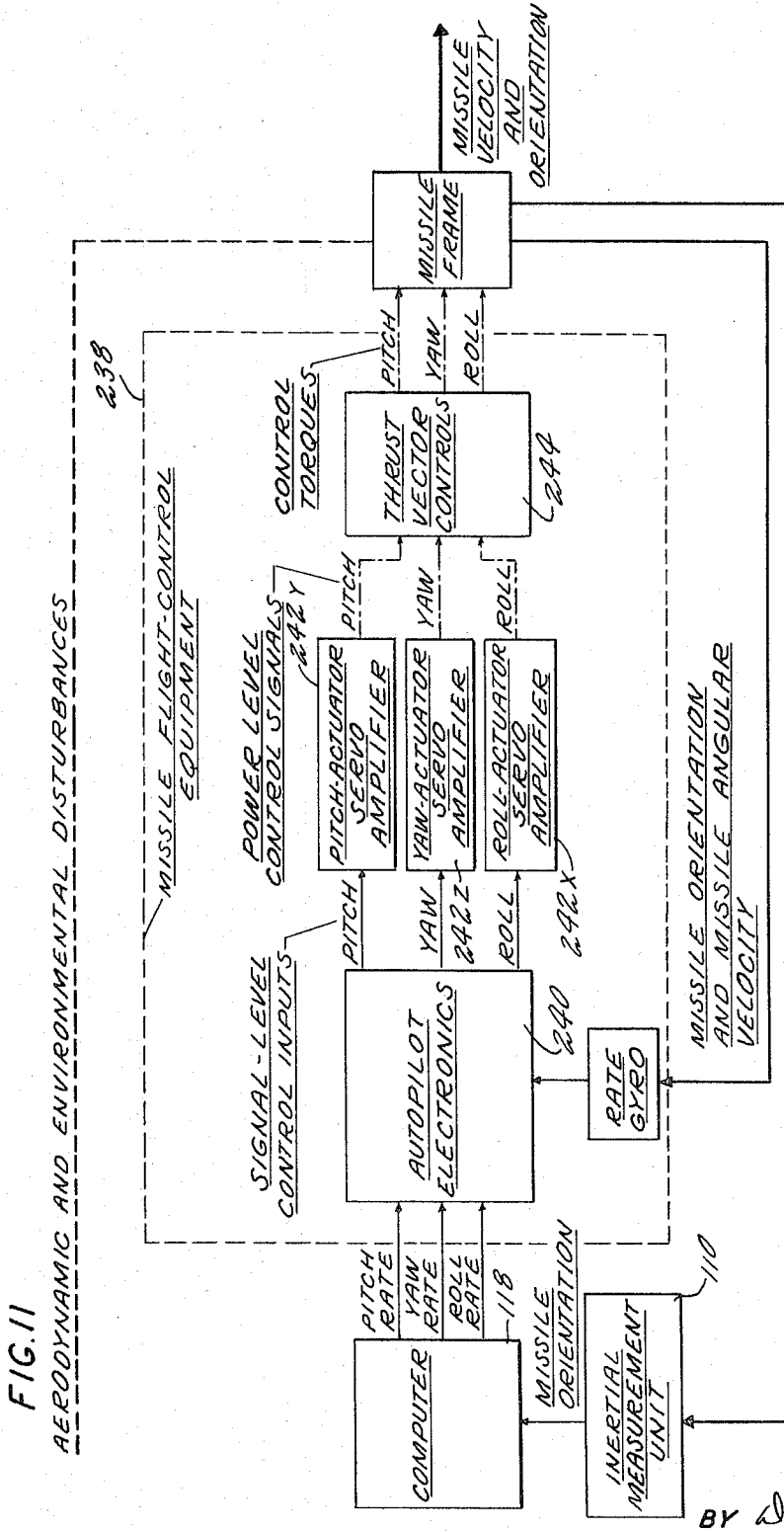
Figure 12:
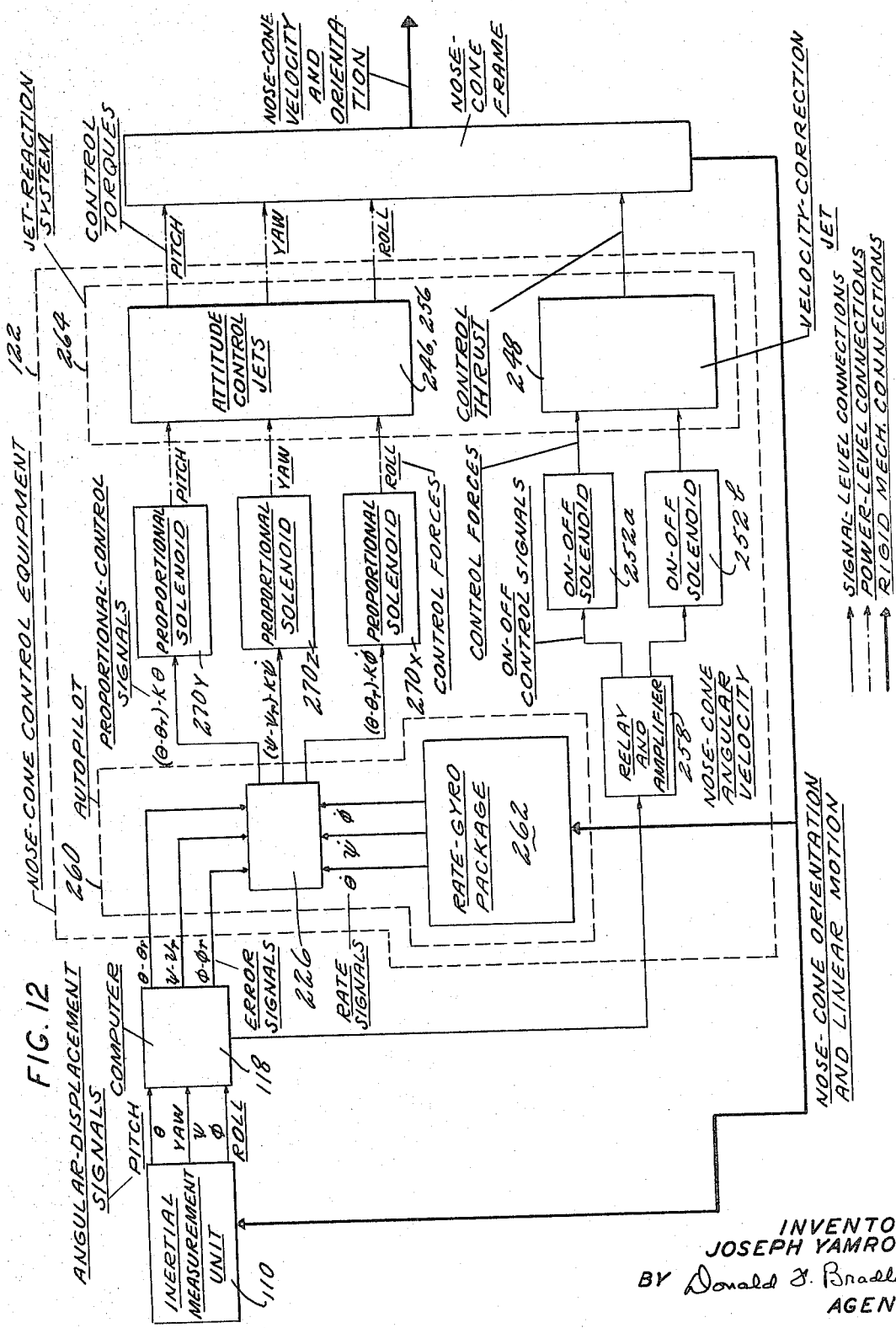
Figure 13:
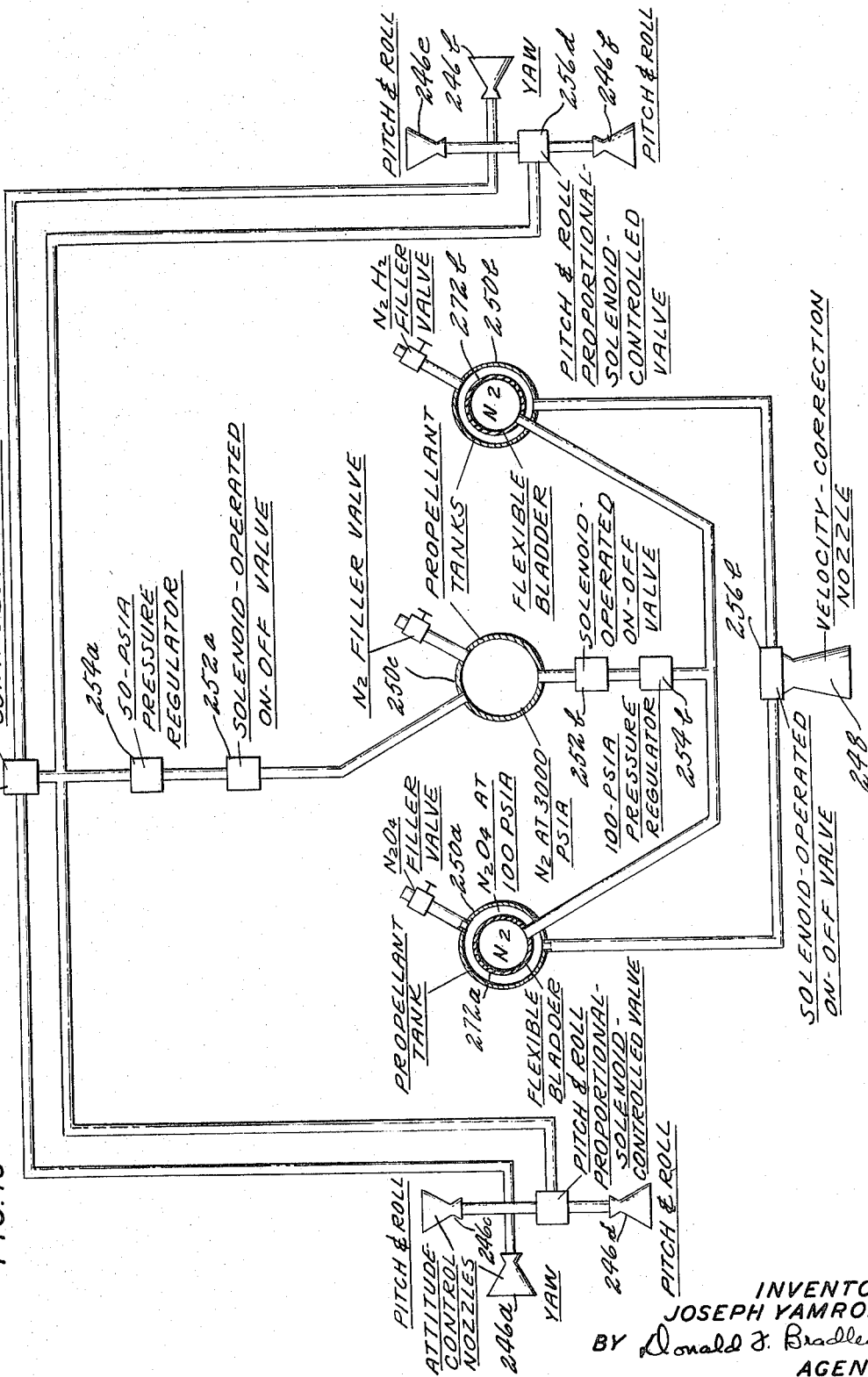
Figure 14:
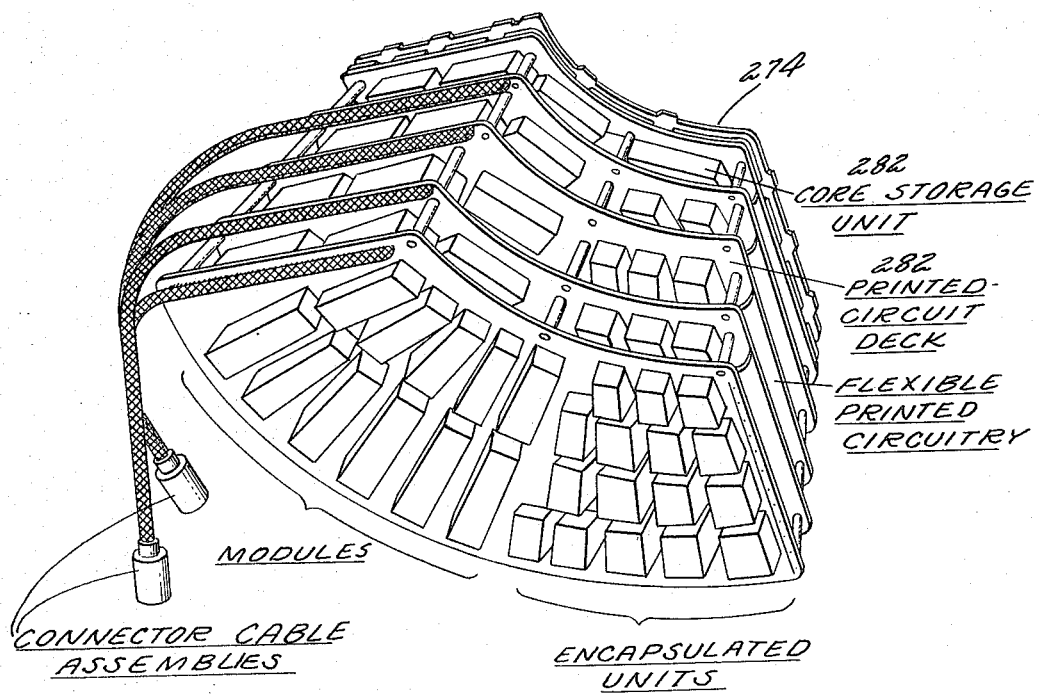
Figure 15:
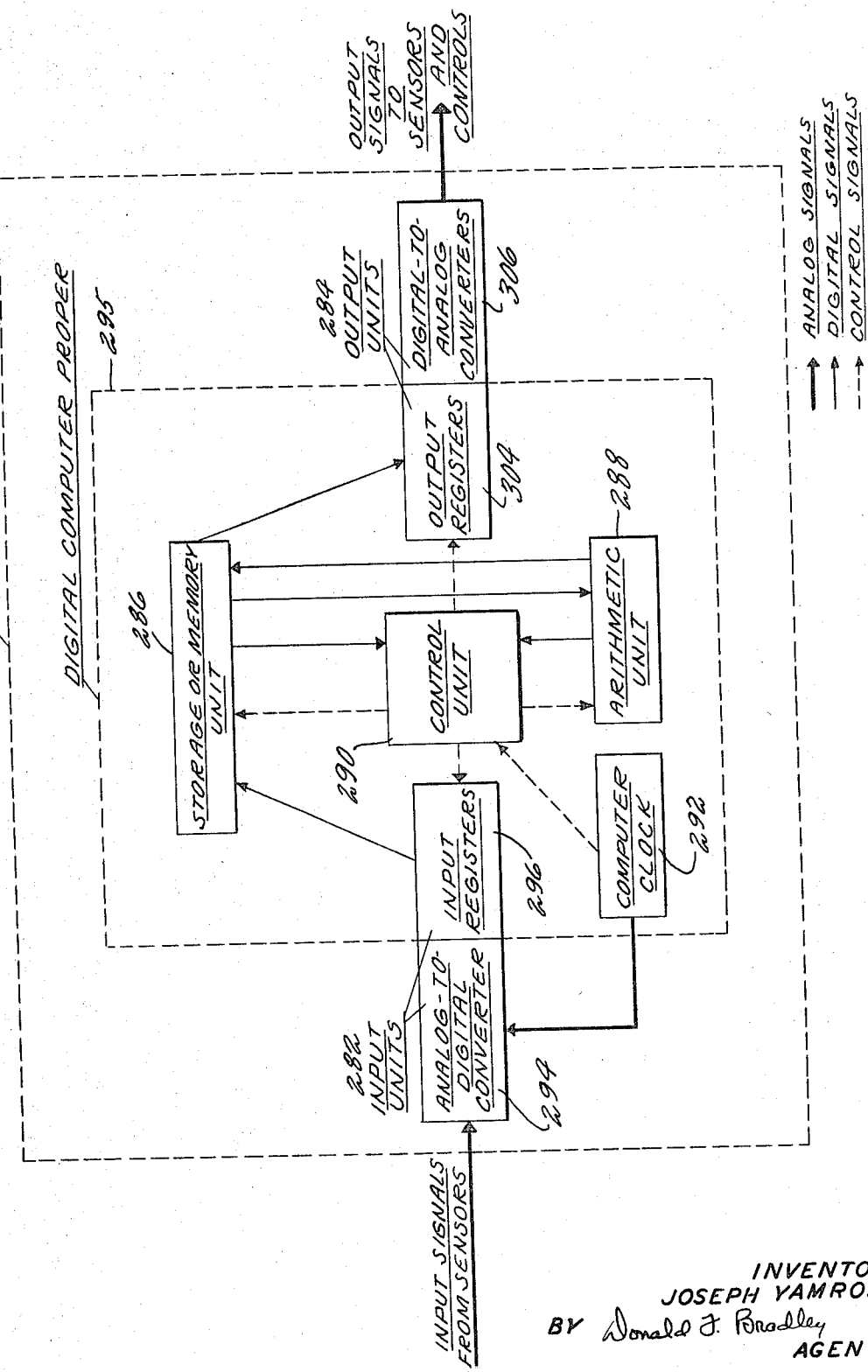
Figure 16:
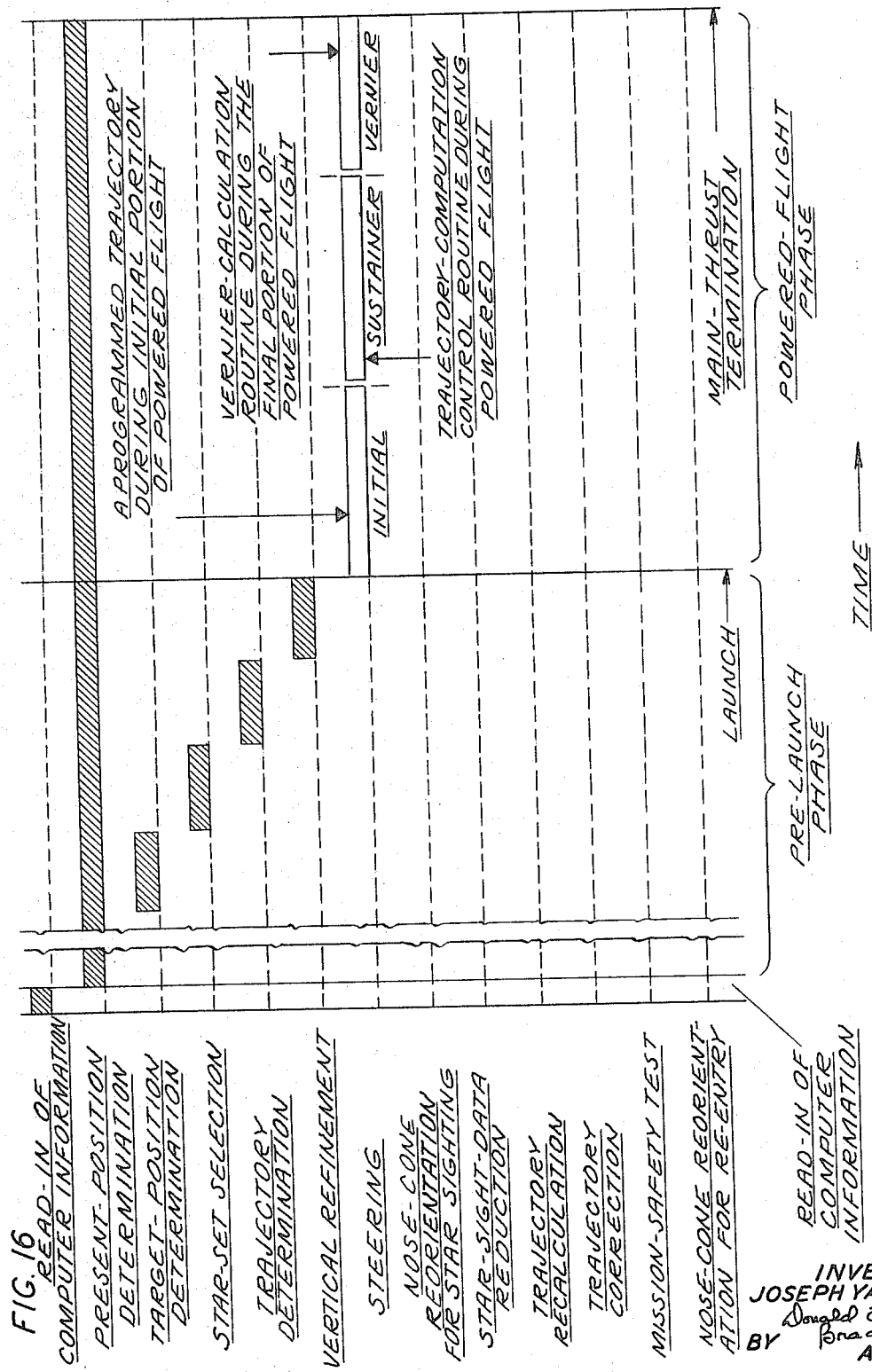
Figure 16A:
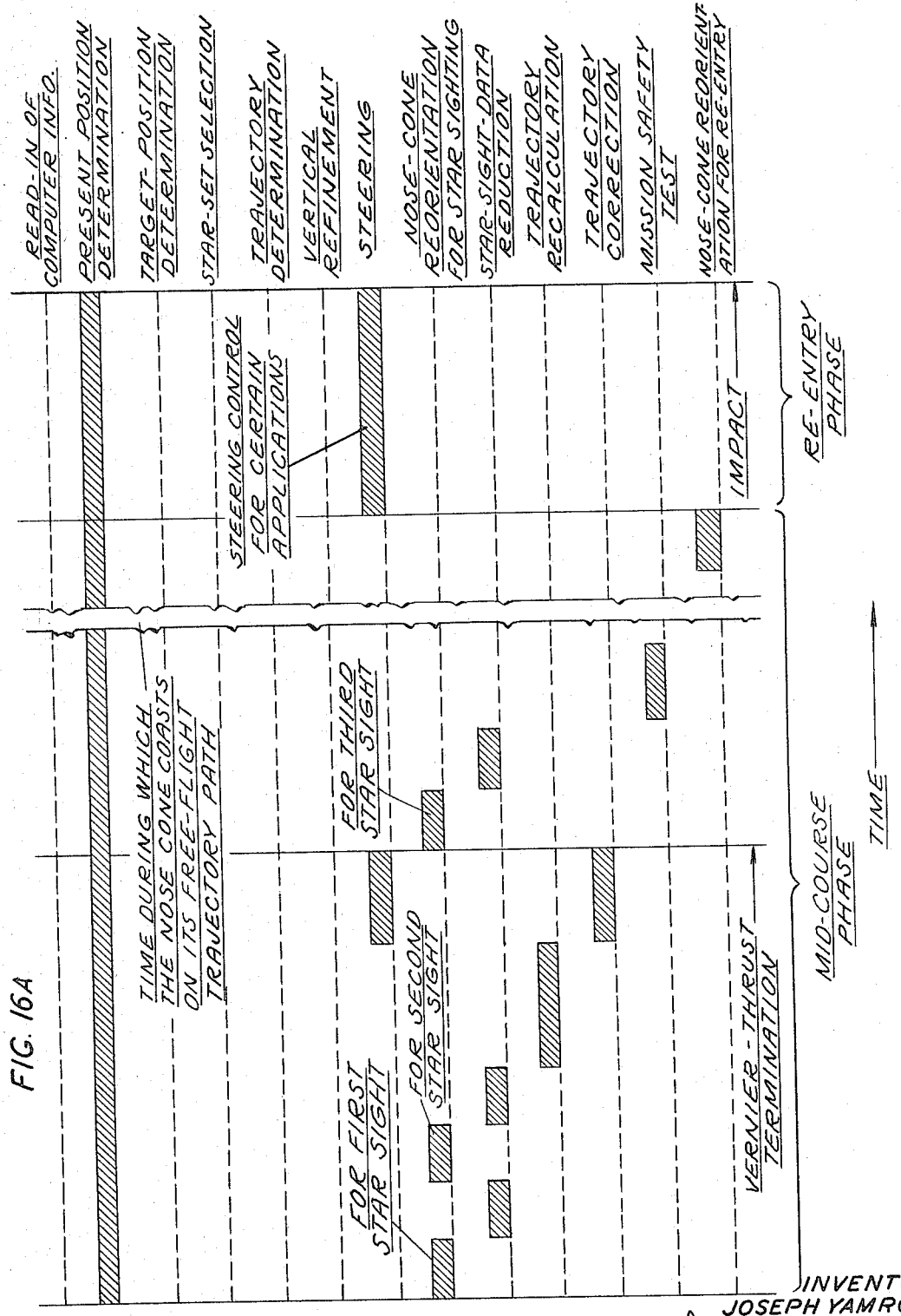

These and other objects and a fuller understanding of the invention may be had by referring to the following description and claims, taken in conjunction with the following drawings in which:

FIG. 1 is a pictorial view of a typical guidance and control system installation in a ballistic missile nosecone; and FIG. 2 is a complete functional block diagram of the guidance and control system employing a gimbaled inertial measurement unit; and FIG. 3 is a pictorial representation of the four phases that comprise a complete ballistic missile mission; and FIG. 4 shows the inertial reference coordinate frame used by the guidance and control system; and FIG. 5 is a pictorial schematic of the mechanical arrangement used with a gimbaled inertial measurement unit; and FIG. 6 and FIG. 6A show a functional block diagram of the gimbaled version of the inertial measurement unit; and FIG. 7 is a schematic representation of the optical and detection system of the star-angle sensor; and FIG. 8 shows star image circles and detector output signal pulse patterns for various star angles; and FIG. 9 is a functional block diagram showing the operation of the star angle sensor output circuits and the associated data processing circuits of the computer; and FIG. 10 shows the relationships between the output signals of the star angle sensor; and FIG. 11 is a functional block diagram of the missile flight control; and FIG. 12 is a functional block diagram of a typical nosecone control equipment; and FIG. 13 is a line-schematic diagram of typical jet reaction system; and FIG. 14 is a pictorial representation of the computer package; and FIG. 15 is a functional block diagram of the missile computer; and FIG. 16 and FIG. 16A show a time diagram showing the sequence of operations performed by the computer during a complete mission.

Before proceeding with a detailed description of the structure of the guidance and control system of this invention, the operation of the system will be described to show how it functions during a complete ballistic missile mission. This mission is considered to begin when the mobile ballistic missile system starts out from a base of operations where time and position are accurately known, and to terminate when the missile nose cone impacts on target. It is to be understood that the system operates in basically the same way if the missile is launched from a known position, where vertical and azimuth must be determined during flight.

The presentation in the following paragraphs will be entirely in terms of system operation, that is, it will relate the parts played by four major functional components of the guidance and control system. No particular attempt will be made at this time to explain the internal functioning of these components.

The four major functional components of the guidance and control system are the inertial measurement unit, the star-angle sensor, the orientation and trajectory control equipment, and the missile computer. These components, together with the associated power supplies, constitute the complete equipment of the guidance and control system. All this equipment is located in the missile nose cone. No other equipment, for example, equipment in a ground truck, is needed for guidance and control. Targeting information can be read into the missile computer by means of a remote data link.

The system operation can best be described by treating each phase of the ballistic missile mission separately and in turn. A complete mission comprises four phases, viz, the pre-launch phase, the powered flight phase, the mid-course phase and the reentry phase. These four phases will be defined and described after a functional description is given of the entire system.

Functional description of the system

The guidance and control system of this invention is represented pictorially in FIG. 1. The nose cone 100 contains all components necessary for accurate guidance and control. Heat shield 102 protects power supply 104 from the intense heat generated during flight in the atmosphere. The payload is represented at 106. Propellant and fuel may be located in tanks 107. The missile computer 118 and inertial measurement unit 110 are located in back of the payload in the central-aft portion of the nose cone 100 and the star-angle sensor 120 and velocity correction jet nozzle 248 are located outside the nose cone itself. The jet nozzle is illustrated as being attached to star-angle sensor 120, but it is obvious that any other arrangement of nozzles may be used. Submerged, flush installations of the velocity correction jet nozzle 248 may be necessary to protect the nose cone during reentry.

FIG. 2 shows that the orientation and linear motion of the missile during powered flight, and the orientation and linear motion of the nose cone following separation, are directly controlled by the orientation and trajectory control equipment 116. This equipment controls the application of forces and torques on the missile frame during the powered flight phase, and of forces and torques on the nose cone frame during the subsequent phases, all in accordance with velocity and orientation command signals that come from the missile computer 118. All of the control equipment required for the powered flight phase is preferably located in the nose cone.

In order to generate these command signals, computer 118 relies upon information stored within its memory unit and utilizies also, at various times during the course of the trajectory, the information provided in the signals from the inertial measurement unit 110 and the star-angle sensor 120.

The input signals from the inertial measurement unit 110 comprise a set that continuously and completely specify any rotation of the nose cone from an inertial reference orientation and a set that continuously and completely specifies the instantaneous linear velocity or acceleration of the nose cone with respect to inertial space. For practical purposes in ballistic-missile applications, inertial space is space with respect to which the Earth makes a complete 360° revolution once every sidereal day. The input signals from the star-angle sensor 120 comprise a set that instantaneously and completely specifies the angular offset between the actual line of sight between the nose cone and a selected star and the direction in which the star-angle sensor 120 was pointed toward the star for the purpose of making a particular star sight. The angular offset, called the star angle, a specified both in magnitude and direction by the signals from the star-angle sensor 120.

All three sets of input signals to the computer 118 may be analog-type signals. Inside the computer 118, which may be a general-purpose digital computer, these signals may be converted to digital signals. These digital signals are then appropriately programmed through the computer in accordance with preset routines to obtain the information required during the various phases of the ballistic-missile mission. This process will be described in general terms for each phase.

The inertial measurement unit 110 provides output signals proportional to changes in orientation of the nose cone with respect to inertial space. The orientation is measured by sensors on the gimbals of the unit. The three gyroscopes are used to form the inner cluster as an inertial reference.

The inertial measurement unit 110 provides output signals proportional to the instantaneous linear velocity of the nose cone through the integrating action of three accelerometer units (to be described later) that are also mounted on the space-stabilized platform and by virtue of the rigid coupling between the interial measurement unit 110 and the nose cone; non-integrating accelerometers may also be used. This rigid coupling means that any changes in the linear velocity of the nose cone with respect to inertial space are instantaneously and accurately sensed by the accelerometer units, integrated, and linear-velocity output signals generated therefrom by the inertial measurement unit 110.

The star-angle sensor 120 provides output signals by virtue of its rigid mounting to the nose cone frame and its ability to accurately and rapidly determine the difference between the direction in which its optical system has been directed by nose cone reorientation for star sighting and the actual line of sight between the nose cone and a selected star. The star-angle sensor 120 rotates with the nose cone as it changes orientation, thereby effectively receiving nose cone orientation as a continuous input (see FIG. 2). The star-sight inputs themselves, however, comprise a set of three sights, two initially for use in determining the accurate position of the launch point, and one subsequently for use in the mission-safety test procedure, that require but a short portion of the time required for the entire missile trajectory.

Detailed descriptions of an inertial measurement unit, star-angle sensor, computor and orientation and trajectory control equipment which may be used to practice this invention will be made following a description of a complete ballistic-missile mission.

FIG. 3 represents pictorially the four phases that comprise a complete ballistic-missile mission. For the sake of illustration, the launching point is shown on the Earth's surface, representing either a launch from land or from the sea. It is important to note that air and space launchings can be equally well handled by a guidance and control system based on the "launch-in-ignorance" concept.

As indicated in by FIG. 3, the pre-launch phase is considered to start when the mobile ballistic-missile system starts out from a base of operations. It ends just before launch, after the vertical has been defined (if necessary) and the missile has been oriented to its lanuching position. During the course of the pre-launch phase, the ballistic-missile system may move over the Earth's surface on whatever ground track it is under order to follow. Navigation with the necessary accuracy for this procedure can be performed by the guidance and control system itself, which is, of course, located in the nose cone of the ballistic missile.

The powered-flight phase starts with the launching of the missile. It ends when second-stage separation occurs. For purposes of presentation the powered-flight phase is considered to have two stages. The first stage ends as the first-stage booster burns out and falls behind the second-stage booster. The second stage ends when the correct cutoff velocity is substantially achieved and the nose cone is separated from the second-stage booster.

FIG. 3 shows that the mid-course phase extends all the way from second-stage separation to the point of reentry into the Earth's atmosphere or to an orbit and subsequently, if required, from orbit back to the atmosphere. During the early part of this phase, the star sights are made, and the required nose cone velocity correction is computed and achieved. During the latter part of this phase, just prior to reentry into the Earth's atmosphere, the nose cone is reoriented to its optimum reentry attitude.

The reentry phase extends all the way from the reentry point to the impact on the target area. Terminal maneuvering during the descent trajectory can be carried out under the direction of the guidance and control system if such is required to achieve the accuracy specified for a particular ballistic-missile application.

The operation of the guidance and control system during each of these four phases will now be described in turn.

The pre-launch phase

The operations performed by the guidance and control system during the pre-launch phase of a complete ballistic-missile mission are: determination of present position, determination of target position, selection of the appropriate three-star set from the computer memory, determination of the desired programmed portion of the trajectory, and refinment of the local vertical, if necessary. For fixed launch applications, present-position will be known. Present-position determination takes place continuously throughout the entire pre-launch phase. The other operations take place just prior to launch, with the ballistic-missile system stopped for ground launching.

Once the aforenoted operations are completed, a set of launch-point conditions and instructions are stored in the computer 118 as follows:

(*a*) Trajectory function.
(*b*) Star set.
(*c*) The local vertical at the launching position.
(*d*) The azimuth (that is, the direction of true north).
(*e*) The velocity at the launching position with respect to inertial space.
(*f*) The latitude of the launching position.
(*g*) The longitude of the launching position.
(*h*) Altitude.

The accuracy of items *d* through *g* are all approximate and will be improved by means of the data obtained subsequently from the star-angle sensor 120.

The only components of the guidance and control system used to carry out the five operations just noted are the inertial measurement unit 110 and the computer 118, both of which are located in the missile's nosecone. It is important to note that these are the same units used during the succeeding phases of the ballistic-missile mission; that is, no special ground-support equipment is required for the present-position determination that takes place prior to launch.

Further information on each of the five operations will be given later. First, however, the inertial-reference coordinate frame used by the guidance and control system and the read-in of computer information at the base of operations will be discussed.

The computational inertial reference system is an inertial coordinate system that is fixed in inertial space and has its origin at the center of the Earth. This system is chosen for computer simplicity, and obviously a different reference system, such as local vertical, may be used.

This system is the basic reference coordinate frame used for computational purposes during a ballistic-missile mission.

Two distinct variations of the inertial reference system are utilized during the ballistic-missile mission: The (E′, N′, U′) system for use during the pre-launch phase, and the (E, N, U) system, for use during the balance of the mission. The (E, N, U) system, which is established at the instant of launch, is defined as follows:

U—Vector along the polar axis of the Earth.
E—Vector that intersects the Equator at the vernal equinox at the time of launch.
N—Vector that intersects the Equator and forms a right-handed system with U and E.

The platform coordinate system is designated (E*p*, N*p*, U*p*). This system is fixed with respect to the axes of the gimbaled inertial measurement unit 110. These axes are coincident with the orthogonal input axes of the inertial sensors. During the pre-launch phase, this coordinate is non-fixed with respect to inertial space; subsequently, it remains inertially fixed for the remainder of the mission.

The body axis system, which is designated (*x*, *y*, *z*), is a coordinate system that has its origin within the missile nosecone and located on the roll axis of the nosecone.

The *x*, *y*, and *z* axes are fixed with respect to the nosecone as follows:

*x*—is coincident with the nosecone roll axis (the thrust axis).
*y*—is coincident with the nosecone pitch axis.
*z*—is coincident with the nosecone yaw axis and completes a right-hand coordinate system.

The local-position coordinate system, which is designated (*e*, *n*, *u*) is a coordinate system whose origin coincides with that of the body axis system. The *e*, *n*, and *u* axes are defined as follows:

*u*—is defined as the local vertical lying along an inertial-coordinate-system radius vector.
*e*— is defined as a vector in the east direction.
*n*—is defined as a vector in the north direction.

The approximate inertial reference system, which is designated ($\overline{E}$, $\overline{N}$, $\overline{U}$), is the reference system maintained by the guidance system until more correct values (E, N, U) are determined after the star sights.

The orientation of each of the coordinate systems just discussed is related to the orientation of each of the other systems by nine directional cosines.

While the missile is at the base of operations prior to the start of the pre-launch phase, the computer program, certain initial conditions, and basic data in tabular form are read into the computer memory unit.

Initial conditions stored at this time include initial position (the latitude, longitude and altitude of the base of operations), vertical, azimuth, mean radius of the Earth, error constants associated with the operation of the inertial measurement unit, the Earth's angular rotation rate, the gravitational constant at the base of operations, and the magnitude values of acceptable errors for use in later logical comparisons.

Data in tabular form may be stored where lengthy computer computations can be avoided, by substituting a programmed table look-up and linear-interpolation routine.

A partial ephemeris of stars, in three-star sets, may be located in the computer memory. The data stored for each star set is in the form of direction cosines between the inertial reference system maintained by the guidance and control system and the line of position between each star and the center of the inertial coordinate frame. Only two of the stars in each star set are required for establishing true orientation of the inertial reference axes, so that a precise launch-position determination and subsequent trajectory correction can be carried out. The third star in each star set is included for use in the mission-safety test procedure that follows during mid-course phase. The three-star sets may be stored in memory locations indexed by the related functions of longitude and sidereal time, so that at the location and time of the subsequent launch the one best three-star set associated with that location and time may be selected.

A table of trigonometric tangent functions may be stored. The data is stored in memory locations numerically related to the angle magnitude.

An average reference trajectory may be stored. This trajectory is stored as a value of velocity-vector orientation (*v*) at uniform incremental time intervals over the course of the trajectory.

At periodic intervals, the read-in of computer information may be repeated. At this time, the computer can be reset with up-to-date present-position information. In addition, any of the stored tabular data can be updated and the computer program modified.

In order to keep track of present position prior to launch, the inertial measurement unit 110 is operated in an undamped Schuler-tuned gyrocompassing mode. This mode of operation allows accurate tracking of the local vertical. Since the direction of the local vertical at any point on the Earth's surface is unique, tracking the vertical provides an accurate means of keeping track of present position. The theory of navigating over the surface of the earth by application of Schuler-tuning techniques to inertial guidance systems, is well documented in such reference works as "Inertial Guidance" by C. S. Draper, W. Wrigley and J. Hovorka of the Massachusetts Institute of Technology (Pergamon Press, 1960). The Schuler-tuned inertial measurement unit provides information on both the vertical and azimuth, that is, the direction of true north. The inertial measurement unit 110 is used as an unaided position-determining device, that is, no external velocity reference is used at all. The maximum error in velocity determination can be held within about 1.4 nautical miles per hour by present state of the art equipment. As a result, the navigation error that is built up over a period of 24 hours can be kept within a limit of approximately 33 nautical miles. This performance can be upgraded if desired by employing an accurate velocity input periodically. One way this can be achieved is by simply stopping the mobile ballistic-missile system so that the missile velocity with respect to the earth is known to be zero. Any error remaining can be easily corrected following second-stage separation, through the "launch-in-ignorance" capability of the guidance and control system.

It is significant that since precise launch position data is not required, means for damping the vertical during the mobile mode, which normally cannot be employed since it tends to produce force-dynamic errors which in turn causes rapid position error buildup, can be utilized periodically.

During the course of the present-position determination, continuous azimuth information is provided by the inertial measurement unit. The accuracy for this measurement can easily be held to within about 0.25 degree of arc at 45 degrees latitude. As already noted, the transformation between the vertical and north coordinates in which the vertical and azimuth-alignment procedures have been developed and the approximate $\overline{E}$, $\overline{N}$, $\overline{U}$ inertial-reference coordinate frame maintained by the guidance and control system is taken care of by the computer.

During the mobile operation of the pre-launch phase, the computer carries out a present-position-determination routine that maintains up-to-date information on missile position, the azimuth, and the vertical. This routine is the same as that used during the powered-flight phase, which will be discussed later. The present position determination equations that apply during pre-launch duplicate the pattern for the powered flight phase.

After the ballistic-missile system has stopped, in order to prepare for a launch, the identity of the intended target is established by the military agency concerned, if this identity has not already been made. The target determination is secure information. No target tables or tapes are necessary and the transfer of target location to the missile computer will be by data-link or ground-base read-in. The target position, in terms of coded latitude, longitude, and altitude, is fed into the computer's memory. The computer instantaneously converts the angular geographical-coordinate data into distance components along the axes of the approximate inertial reference coordinate system, whose origin is at the Earth's center. These distance components include the necessary corrections for the oblateness of the Earth. If retargeting is necessary, it can be performed in a matter of seconds.

The target-position, expressed in geographic terms, is translated to an inertial coordinate position at the time of launch in the following manner—

Given: target latitude, target longitude, target altitude, and the known oblate radius $r$, of the Earth at the given latitude.

Then:

$$E_{T_0} = r \cos (\text{latitude}) \cos (\text{longitude})$$
$$N_{T_0} = r \cos (\text{latitude}) \cos (90° - \text{longitude})$$
$$U_{T_0} = r \cos (90° - \text{latitude})$$

and the direction cosines of the target are $$\cos (u_{T_0}, E_{T_0}) = \frac{E_{T_0}}{r}$$

$$\cos (u_{T_0}, N_{T_0}) = \frac{N_{T_0}}{r}$$

$$\cos (u_{T_0}, U_{T_0}) = \frac{U_{T_0}}{r}$$

where $u$ is the direction of the local vertical.

Following the target-data conversions, the computer proceeds to the final star-set-selection routine. The set of stars to be sighted on is actually continuously reselected by the computer during the course of movement associated with the pre-launch phase. Utilizing the Greenwich-hour angle of the vernal equinox stored as an initial-condition input prior to the start of mobile operation, the longitude of the launching point, as determined by the present-position-determination routine, and the sidereal time that has elapsed since the star tables were inserted, the computer determines from the stored star tabulations the appropriate star set for the particular launching position at hand.

The ephemeris of stars in three-star sets is inserted into the computer's memory during the read-in of computer information at the base of operations. The star sets are stored as direction cosines as follows:

$$\cos (S_1, E), \cos (S_1, N), \cos (S_1, U)$$

Star set $\alpha_i$:

$$\cos (S_2, E), \cos (S_2, N) \cos (S_2, U)$$

$$\cos (S_3, E), \cos (S_3, N), \cos (S_3, U)$$

where $i = 1, 2, 3, \ldots, n$ and $n$ is the total number of star sets in the ephemeris of stars.

Each star set, $\alpha_i$, is pre-selected as an optimum set associated with a specific launch point and time. The launch point is defined in terms of the angular displacement of the launch-point meridian east from the vernal equinox. The star-set selection for the launch point, $\alpha_{LP}$, is made as follows:

$$\alpha_{LP} = GHA_r{}^0 + \omega_e \, \Delta ST_E + \lambda_{\text{east}}$$

and $$\alpha_{i-1} \leqslant \alpha \leqslant \alpha_i$$

where:

$GHA_r$ = the Greenwich-hour angle of the vernal equinox at the initiation of the system
$\lambda_{L \text{ east}}$ = the longitude of the launch point
$\Delta ST_E$ = the change in sidereal time since initiation of the system
$\omega_e$ = rotational rate of the Earth The stars considered for sighting are a predetermined group of stars of third magnitude or brighter, preferably located close to the celestial equator in declination. The coordinates of these stars are tabled in the computer in sets versus sidereal time. For each instant of time, there is a pair of stars nominally 90 degrees apart in sidereal hour angle, for use in determining the orientation error of the approximate inertial reference system $\overline{E}$, $\overline{N}$, $\overline{U}$ maintained by the guidance and control system. This pair provides a star on the horizon to the east or to the west and one to the south (in the northern hemisphere). For launches anywhere in the northern hemisphere, for example, a total of 27 stars may suffice for the star pair.

The star pairing will not be constant, but will be applicable for a given interval of time. While it is stated that the stars should be nominally 90 degrees apart and close to the celestial equator, variations of ±10 degrees in sidereal hour angle and ±20 degrees in declination are completely acceptable since these variations result in negligible error.

A third star in the set is used as a safety check before arming the missile in certain tactical applications. The use of this star sight will be described later.

The target and launching positions in the $\overline{E}$, $\overline{N}$, $\overline{U}$ approximate inertial-reference coordinate system and the stored reference trajectory form the collective input to an iterative routine that computes the best trajectory for the particular mission. First, the Earth angle from the launching position to the target position is calculated. Then the desired cutoff velocity to be achieved at the end of the powered-flight phase is calculated by using an appropriate hit equation and the stored trajectory variables. Once the desired cutoff velocity has been established, the time of flight is computed. This time is used in connection with the Earth's rotation rate to compute a new target location, in inertial coordinates, at the time of impact. The revised target location is the basic data input for a repetition of the entire cycle, which is repeated until both the cutoff velocity and the time of flight are established to a predetermined accuracy. When these accuracy requirements are satisfied, the latest tabular values of trajectory, time of flight, Earth angle from the launching position to the target position, and target position are stored in the computer for subsequent use by the steering routine employed during the powered-flight phase.

The target position determination, star-set selection, trajectory determination and vertical refinement, if necessary, all take place in less than one minute just before the missile is launched. If retargeting is necessary, this can be done in a matter of seconds.

*The powered-flight phase*

The essential operations performed by the guidance and control system during the powered-flight phase of a complete ballistic-missile mission are keeping track of the missile's present position and steering the missile. Both operations take place concurrently. The position-determination process is a continuation of that which occurred prior to launch. The steering starts with the vertical ascent of the missile immediately following launch and lasts until the termination of main thrust, which takes place as a result of second-stage separation.

The components involved in position determination during the power-flight phase are the inertial measurement unit 110 and the computer 118 just as is the case during the pre-launch phase. The essential difference is that, during the powered-flight phase, the inertial measurement unit 110 is no longer operating as a gyrocompassing, undamped Schuler-tuned system. This is because the missile is no longer moving over the Earth's surface at a relatively fixed altitude (which would be zero for a missile launched from the surface of the ocean; negative for an underwater launch; and positive for a missile launched from the ground or an aircraft in flight or from a space satellite). During the powered-flight phase, the linear acceleration of the missile with respect to inertial space is sensed along the three orthogonal axes of the inertial measurement unit 110. These axes remain fixed with respect to intertial space from the time of launch until impact occurs. By doubly integrating these linear-displacement components and taking account of the presence of gravity components, linear-displacement components along the axes of the approximate inertial reference system $\overline{E}$, $\overline{N}$, $\overline{U}$ that is maintained by the guidance and control system are obtained. Referring these displacement components to the launch position of the missile allows the present missile position in the $\overline{E}$, $\overline{N}$, $\overline{U}$ system to be continuously determined by the computer.

The first of the two integrations noted takes place in the inertial measurement unit 110, through the action of three integrating accelerometers. The resulting signals are sent to the computer in order that up-to-date information on the magnitude and orientation of the missile velocity vector can be generated and in order that the second integration can be applied to determine the linear-displacement components.

To provide this information, the computer samples the output signals of the inertial measurement unit 110 at discrete intervals, computes the incremental change in missile-velocity magnitude, missile-velocity orientation and missile position since the previous sample and updates the previous data appropriately. At predetermined intervals, the current data, up-dated cycle-by-cycle, is recorded in permanent memory locations as the experienced trajectory data for use in the subsequent trajectory recalculation during the mid-course phase.

The present-position determination routine employed depends upon the type of inertial measure unit used in the guidance and control system. It should be noted that the only difference between a gimbaled and a strapped-down inertial measurement unit operation in the computer is in the present-position determination routine.

When a gimbaled inertial measurement unit is used, the computer inputs consist of data on attitude and velocity obtained by means of gimbal angle transducers and three pendulous integrating gyro accelerometers (PIGA units), and their associated circuitry in the inertial measurement unit 110 (see FIG. 6). These components will be described in detail later. The attitude data represents the angular relationship of the missile-body axes with respect to the $\overline{E}$, $\overline{N}$, $\overline{U}$ inertial reference axes; the velocity data represents missile velocity components along the inertial reference axes. This velocity data is then corrected to eliminate the velocity components due to gravity, which result from integrating the gravity components in the total specific force sensed by the accelerometers. The resultant inertial velocity components are then integrated, with respect to time, to give the inertial position in terms of distances along the inertial reference axes. The inertial-axis distance components are combined vectorially to give the current radius vector from the center of the inertial coordinate system, which coincides with the center of the Earth, to the missile.

As a subroutine of the present-position determination routine, the gravitational constant at the Earth's surface is periodically corrected to reflect the earth's oblateness at the current missile position. This correction subroutine is required with both types of inertial measurement unit.

The components involved in steering the missile during the powered-flight phase are the computer 118, and the missile flight control equipment 238 (see FIG. 2). Steering command signals generated by the computer 118 are sent to the missile flight-control equipment 238 to guide the missile through the basic trajectory that was selected during the pre-launch phase. During the initial portion of powered-flight, the computer 118 generates pitch and yaw steering signals based on a comparison of the current missile position and vector velocity, as calculated in the present-position determination routine, with the programmed trajectory data stored in the computer's memory.

After the missile has pitched over in its programmed trajectory, the sustainer portion of powered-flight commences. During this portion of powered-flight, the computer provides steering signals based upon continuously updated trajectory computations obtained through a repetition of the pre-launch trajectory-determination routine, using the last time-of-flight value calculated during the pre-launch phase. These updated trajectory computations provide the data on which to base the thrust-termination decision. During each computation cycle, the desired cutoff velocity determined in the trajectory computation is compared with the measured missile velocity. Specifically, at a given time after launch the velocity needed to hit the target with the existing range angle ($\phi$) and burn-out angle ($\gamma^*$) measured from the geocentric vertical is computed and compared with the actual velocity.

$$|V^* - V| \leq C_1$$

Where: $V^*$ = calculated value of velocity at the present time necessary to hit the target
$V$ = true or measured velocity
$C_1$ = a constant $$V^* = \left[ \frac{GM(1 - \cos\phi)}{\overline{R}\left[\frac{\overline{R}}{\overline{R}_T}\sin^2\gamma^2 + \sin(\phi - \gamma^*)\sin\gamma^*\right]} \right]^{1/2}$$

Where $GM$ = gravitational product of the Earth.

$$\overline{R} = [\overline{E}^2 + \overline{N}^2 + \overline{U}^2]^{1/2}$$

$$\overline{R}_T = [\overline{E}_T^2 + \overline{N}_T^2 + \overline{U}_T^2]^{1/2}$$

(T is at the target.)

This operation is repeated until the difference is less than $C_1$. Once the desired cutoff velocity has been established the calculation of the time of flight is computed and added.

$$T^* = \frac{\overline{R}}{V^* \sin\gamma^*}\left\{\frac{(1-\cos\phi)\cot\gamma^* + (1-\lambda)\sin\phi}{(2-\lambda)\frac{\overline{R}}{\overline{R}_T}} + \frac{2\sin\gamma^*}{\lambda\left[\frac{2}{\lambda}-1\right]^{3/2}} \tan^{-1}\left[\frac{\left(\frac{2}{\lambda}-1\right)^{1/2}}{\sin\gamma^*\cot\frac{\phi}{2} - \cos\gamma^*}\right]\right\}$$

Where $$\lambda = \frac{\overline{R}V^{*2}}{GM}$$

This value of $T^*$ is used in connection with the Earth's rotation rate to compute the target position in inertial coordinates at impact.

When the velocity difference becomes less than a predetermined amount, the computer proceeds to a vernier-calculation routine. During this routine, the velocity difference is reduced, and the target position and time of flight are recomputed each cycle. The vernier control may be in the computation only; no vernier rockets are required during the powered-flight phase. This data forms the basis for both the ensuing steering signals and the thrust-termination command signal. When the required velocity and the measured velocity differ by the new predetermined amount, the computer commands thrust termination. This thrust termination, which represents the end of the powered-flight phase, is accomplished by separation of the nosecone from the second-stage booster and controlled deceleration of this booster, for example, by activating blow-out ports at the forward end of the propellant chamber if a solid propellant rocket is used.

The primary function of the missile flight control equipment 238 is to cause the missile to perform programmed turn maneuvers and commanded trajectory-correction maneuvers, all in accordance with the aforenoted steering signals from the computer. The missile flight-control 238 equipment also serves to stabilize the missile against aerodynamic interference torques.

Basic servo loops provide for control in pitch, yaw, and roll via an orientation and angular-velocity feedback path, as shown in FIGURE 2.

The control exerted on the missile by the combined action of the computer 118 and missile flight-control equipment 238 that has just been described can be summarized as follows:

Immediately following launch, during the initial portion of powered flight, the guidance and control system causes the missile to rise vertically for a few seconds. During this time, the missile is rotated about the roll axis until a pitch axis is established perpendicular to the reference trajectory plane, thus appropriately aligning the nozzles of the jet-reaction equipment with respect to the flight path. The maximum rotation of the missile required to accomplish this is 45 degrees. The missile is roll-stabilized throughout the remainder of the powered-flight phase.

Following the short vertical-ascent phase, which allows the missile to safely clear the launching area, the second portion of powered flight commences. During this portion of powered flight, termed the sustainer portion, the pitch orientation of the missile varies in accordance with the timed program that was calculated by the computer just prior to launch and stored therein. This programmed turn maneuver causes the missile to fly a standard pitch reference trajectory for the particular target under attack as closely as the control-system inaccuracies and the variations in thrust permit. The yaw steering signals are normally zero and the missile flight-control system accordingly maintains a constant yaw orientation for the missile. Programmed loop-gain changes stored within the computer are used to compensate for the changes in dynamic pressure and vehicle mass that take place during the course of the powered-flight phase as the propellant burns.

Toward the end of the powered-flight phase, after the missile has attained sufficient velocity to allow meaningful calculations to be made, the computer 118 provides steering signals based upon continuously updated trajectory computations. During this portion of the powered-flight phase, called the vernier portion, yaw steering signals are supplied to the missile flight-control equipment by the computer to correct for deviations from the updated trajectory. Control in pitch remains programmed as during the preceding portion of the powered-flight phase. This type of control continues until the calculated cutoff velocity is attained. Extreme accuracy is not required, because of the velocity-correction capability provided to the nosecone during the mid-course phase by the guidance and control system. Once the computer ascertains that the calculated cutoff velocity has been achieved, it sends a signal to the missile flight-control equipment that initiates separation of the nosecone from the second-stage booster. This action terminates main thrust and hence the powered-flight phase of the complete ballistic-missile mission.

*The mid-course phase*

The essential operations performed by the guidance and control system during the mid-course phase of a complete ballistic-missile mission are the following:

(a) Present-position determination.
(b) Nosecone stabilization following second-stage separation.
(c) Nosecone reorientation for each of the three star sights.
(d) Star-sight-data reduction.
(e) Trajectory recalculation.
(f) Trajectory correction.
(g) Mission-safety test procedure.
(h) Reorientation of the nosecone for reentry.

The components of the guidance and control system used in carrying out these operations are the inertial measurement unit 110, the star-angle sensor 120, the computer 118, and the nosecone control equipment 122 (see FIG. 2). Each of these operations will be described in turn.

(a) *Present-position determination.*—This operation is a continuation of that carried out by the inertial measurement unit 110 and the computer 118 during the powered-flight phase.

(b) *Nosecone stabilization following second-stage separation.*—During the separation of the nosecone from the second stage, it is more than likely that undesirable torques will be applied to the nosecone. This is of no concern, however, because the guidance and control system is fully capable of stabilizing the nosecone against any undesirable rotations. Reference to the functional diagrams of FIGURE 2 shows that such rotations are sensed by the inertial measurement unit 110 via the feedback path indicated as 124. This orientation information is sent to the computer 118, which in turn sends appropriate control signals to the nosecone control equipment 122. In response to these signals, the jet-reaction nosecone control equipment 122 is activated and applies control torques to the nosecone that correct the undesired rotations. Because the over-all attitude control system is so fast acting, it serves very well to stabilize the nosecone against the action of undesirable torques.

(c) *Nosecone reorientation for the three star sights.*—In order to perform the first star sight, the nosecone must be reoriented so that the viewing axis of the star-angle sensor 120 lies along, or very nearly parallel to, the vector between the nosecone and the star that has been selected to be viewed. The relationships between the inertial direction cosines of the star position and the direction cosines between the nosecones axes and the approximate inertial-reference-axis orientation calculated by the computer 118 provide the approximate direction cosines between the nosecone axes and the star position. Based on this information the computer 118 provides appropriate orientation command signals to the nosecone control equipment 122. These commands are rate commands in pitch and roll that allow the inertial-to-nosecone-axis direction cosines to decrease linearly to a predetermined order of magnitude. No yaw commands are generated since it is the direction of the yaw axis that is being controlled. The nosecone control equipment 122 receives the orientation command signals from the computer 118 and rotates the nosecone in pitch and roll as required to correctly position the star-angle sensor 120. The reorientation of the nosecone is a closed-loop operation (see FIG. 2) in which the inertial measurement unit 110 senses the nosecone orientation change and furnishes this information to the computer 118 for its use in generating further orientation command signals. As soon as the computer 118 recognizes that the desired on-target orientation of the star-angle sensor 120 exists, it sends an "on-star" signal to the star-angle sensor 120. This signal actuates a solenoidally-operated shutter in the optical system and thereby informs the sensor 120 that the computer 118 is prepared to receive its output signals.

(d) *Star-sight-data reduction.*—When the nosecone is in the correct orientation to put the star into the field of view of the star-angle sensor 120, a shutter in the sensor is opened and the sensor starts operating. The sensor provides star-angle data to the computer 118 in the form of a cyclic digital-pulse train that relates the position of the star image on the reticle in the sensor to the center of the reticle. (See FIGS. 7 and 9). This position relationship very accurately represents the star angle itself, which is the angle between the line of sight of the star-angle sensor 120 and the line of sight to the selected star. The computer 118 counts the number of pulses during each cycle, and then obtains the weighted average of all cycles to determine the position of the image on the reticle. This calculation is performed by the computer 118, in accordance with stored equations.

The procedure just described is repeated for the data obtained from the second star sight. The weighted counts, when related to the viewing axis of the star-angle sensor 120, represent the error in the previously computed orientation of the inertial reference axes that resulted from the launch-in-ignorance condition.

The weighted counts from the two star sights are correlated and converted by the computer 118 into error directional cosines. These directional cosines are mathematical statements of the orientation of the approximate inertial reference axes $\overline{E}$, $\overline{N}$, $\overline{U}$ stored in the computer with respect to the true inertial reference axes E, N, U.

(e) *Trajectory recalculation.*—Once the inertial-axes orientation error has been determined in terms of the error directional cosines, the computer 118 proceeds to accurately calculate the actual launching position. To accomplish this, the approximate inertial-coordinate distances of the assumed launching position are transformed to accurate inertial-coordinate distances by application of the error directional cosines obtained from the two star sights. The mathematics of such a transformation are well known and will not be described here.

Using the refined coordinates of the launch point, the stored accelerometer data is reoriented and gravity components removed as required to give the true inertial velocity and position at each time interval. The computer 118 thus functions in an iteration of the present-position determination routine to up-date the trajectory and establish the true present inertial velocity and position. It is also possible to determine the accelerometer bias error in free flight and use the bias error to correct the stored trajectory data.

(f) *Trajectory correction.*—Upon completion of the trajectory recalculation to the present position, trajectory-correction computations are started. The computations required for trajectory correction duplicate the trajectory-computation routine followed in the pre-launch and powered-flight phases, utilizing the corrected inertial-velocity-and-position data. By comparing the desired velocity orientation and the measured velocity orientation, the computer 118 generates roll, pitch, and yaw for use by the attitude control system of the nosecone control equipment 122. Based on the difference between the desired and measured velocity magnitudes, the computer 118 generates commands for the velocity-correction system of the nosecone control equipment 122. The nosecone control equipment 122 receives the orientation command signals from the computer 118 and rotates the nosecone in yaw, pitch and roll as required to correctly position it for application of the velocity correction. As already noted, the reorientation of the nosecone is a closed-loop operation.

To obtain the direction cosines of the proper nosecone position and the magnitude of the velocity correction, the following equations are solved:

$$\sin \gamma^* = \sin \gamma \cos \Delta\gamma_i + \sin \Delta\gamma_i \cos \gamma$$

$$\cos \gamma^* = \cos \gamma \cos \Delta\gamma_i - \sin \gamma \sin \Delta\gamma L$$

$$V^* = \left[ \frac{\frac{GM}{R}(1-\cos \phi)}{\frac{R}{R_T}\sin^2 \gamma^* + \sin(\phi-\gamma^*)\sin \gamma^*} \right]^{1/2}$$

$$\sin \Delta\gamma_i = \frac{V^* - V \cos \Delta\gamma}{2V} \left[ \frac{\frac{R}{R_T}\sin 2\gamma + \sin(\phi-2\gamma)}{\frac{R}{R_T}\sin 2\gamma + \sin(\phi+\gamma)\sin \gamma} \right]$$

$$\cos \Delta\gamma_i = [1-\sin^2 \Delta\gamma_i]^{1/2}$$

Where V and $\gamma$ are the conditions that exist at the time the computation starts.

Once the required nosecone attitude has been achieved, the required magnitude of the velocity change is obtained, by means of a single jet nozzle of the nosecone control equipment. This velocity correction is also a closed-loop operation (see FIG. 2) in which the inertial measurement unit 110 senses the nosecone linear-velocity change and furnishes this information continuously to the computer 118 for its use in determining when the required velocity correction has been made.

(g) *Mission-safety test procedure.*—When the required trajectory corrections have been completed following the first two star sights, the mission-safety test procedure is initiated.

The nosecone is reoriented for the third star sight in the manner previously described for the first two star sights.

The star-angle sensor data provided by the third star sight is sequentially combined with the star-angle sensor data from the first and second star sights, in order to provide two new sets of error directional cosines. Each of these new sets of directional cosines provides the basis for a repetition of the actual-launch-position, trajectory-recalculation, and velocity-correction routines previously discussed.

The third star sight thus provides three sets of data as follows:

Star sight 1 and star sight 2 yield $(LP)_0$ and $(\Delta V)_0$
Star sight 1 and star sight 3 yield $(LP)_1$ and $(\Delta V)_1$
Star sight 2 and star sight 3 yield $(LP)_2$ and $(\Delta V)_2$ Where (LP) is the actual launch position, expressed in terms of inertial vector magnitudes, and ($\Delta V$) is the magnitude of velocity correction.

With three sets of data now available, each relating to an actual launch position and a required velocity correction, the computer proceeds to compare the launch position and the required velocity correction of each set of data against the launch position and required velocity correction of the other two sets of data.

For example, the following relationships must hold true if the missile has been following the proper trajectory:

$$(LP)_0 - (LP)_1 \leq \text{Permissible } LP \text{ variation}$$

$$(\Delta V)_0 - (\Delta V) \leq \text{Permissible } \Delta V \text{ variation}$$

If the nosecone has been operating properly, the differences in launch position and in the velocity correction required will fall with a predetermined magnitude. This will indicate a safe ballistic-missile mission. If one or more of the position or velocity-correction differentials lie outside the permissable range, a malfunction of the guidance and control system is indicated.

The computer 118 is programmed to recognize that this condition indicates an unsafe mission. Accordingly, it will initiate action to prohibit arming of the warhead carried by the nosecone, or destroy the nosecone in flight.

(h) *Reorientation of the nosecone for reentry.*—Prior to its reentry into the atmosphere, the nosecone must assume an attitude along the trajectory curve. At a predetermined position from the Earth's center, calculated by the present-position-determination routine, the computer 118 generates orientation command signals for the attitude control system of the nosecone control equipment 122 to orient the nosecone in the proper reentry attitude. In so doing, the computer 118 utilizes the relationship between the directional cosines between the nosecone axes and the inertial reference axes and also the directional cosines of the nosecone velocity vector in order to determine the directional cosines between the nosecone axes and the nosecone velocity vector. The reorientation routine used by the computer 118 and the operations carried out by the nosecone control equipment 122 are similar to those followed during the reorientation of the nosecone for star sighting. For ballistic-missile missions that do not require nosecone maneuvering in the reentry phase, the nosecone is spun about its roll axis by the reaction system prior to reentry. This is done to minimize the random dispersions that occur during the mid-course and reentry phase.

*The reentry phase*

For certain long-range ballistic-missile applications, control during the reentry phase of the ballistic-missile is required in order to achieve the required accuracy at impact. In order to achieve this control, the computer 118 provides appropriate steering-command signals to the nosecone control equipment 122 using orientation information from the inertial measurement unit 110. As in the case of control during the mid-course phase, the command signals generated by the computer are based on the difference between the desired nosecone velocity vector and the actual velocity vector. The jet-reaction equipment responds to these commands in accordance with the operations described for nosecone velocity correction in the mid-course phase.

For certain applications in which no correction of the descent trajectory during the reentry phase is required, it is desirable to spin the nosecone about its roll axis in order to minimize random dispersions. This rotation can be readily provided by either jet-reaction equipment in response to control signals from the computer, and/or small aerodynamic fins.

*The inertial measurement unit*

The most economical approach for the guidance of a mobile ballistic-missile system is to use a single inertial measurement unit 110 during the entire mission, that is, from the base of operations to impact on the target. To provide guidance during the entire mission, the inertial measurement unit 110 must be located in the nosecone.

The design of the inertial measurement unit 110 and the components used to make up the guidance system can be chosen according to the type of missile. For a long-range missile (ICBM), which requires the utmost in guidance accuracy and requires steering following reentry into the atmosphere, a gimbaled version of the inertial measurement unit 110 provides excellent performance. The gimbaled version represents an accurate, tried-and-proven method for establishing a reference by inertial-guidance techniques. The gimbaled version is also capable of maintaining a satisfactory reference during the few seconds of high accelerations that occur at reentry into the atmosphere.

For a shorter-range missile (MRBM), which requires less accuracy in guidance to provide the same accuracy at target and may not require steering following reentry into the atmosphere, a strapped-down version of the inertial measurement unit 110 can be used as an alternative to the gimbaled version. The inertial components of the strapped-down version are grouped together in a common housing that is directly secured to the nosecone frame. Any misalignments can be measured and entered into the computer as constant multipliers. Pulse torquing of gyros and accelerometers may be used, which lends itself well to digital-computer operation.

A digital computer is used with either the gimbaled or strapped-down version. However, analog-to-digital conversion may be required for the gimbaled version. A representative gimbaled inertial measurement unit 110 will now be described in detail. The system shown represents a platform reference in local Earth coordinates. The specified system uses an inertial coordinate system as a platform reference. Any reference could be implemented; the particular equations presented herein are for use with an inertial system.

The gimbaled version of the inertial measurement unit (IMU) comprises the mechanical arrangement shown in FIGURE 5 together with the associated electronic equipment. As shown by FIGURE 5, the mechanical components of this version of the IMU comprise a space-stabilized platform 126, three single-degree-of-freedom integrating gyro units 128 and three pendulous integrating gyro accelerometers (PIGA units) 130 mounted on the platform 126, and a four-gimbal arrangement that provides all attitude rotational freedom of the platform 126 with respect to the nosecone structure. The electronic components must be able to withstand the high accelerations associated with launching and with reentry of the nosecone into the Earth's atmosphere.

The gimbaled inertial measurement unit is located in the central-aft portion of the nosecone (see FIG. 1). The unit may be hermetically sealed by a case attached to the outer roll gimbal 132 and contain one atmosphere of helium. The IMU may be secured to the bulkheads on the nosecone frame by means of trunnions that support the bearings 134 of the outer roll gimbal 132.

The functional operation of the gimbaled IMU can be described in terms of the block diagram given in FIG. 6. This diagram shows the relationships between all the various components of the gimbal assembly, the electronics, the gyro units, and the PIGA units. It should be understood that the block diagram of FIG. 6 is merely one possible way of performing the operations and that other methods may be used in the system.

The gimbal sequence, starting at the outside, is outer roll 132, pitch 136, inner roll 138, and yaw 140. The outer roll gimbal 132 is mounted to the nosecone frame 142 with angular freedom about the roll axis. The pitch gimbal 136 is mounted to the outer roll gimbal with angular freedom about the pitch axis. The yaw gimbal 140, which is the stabilized platform 126, is mounted to the inner roll gimbal 138 with angular freedom about the yaw axis. All the gimbals, with the exception of the inner roll gimbal 138, have a rotational freedom of 360 degrees about their axis of rotation. The inner roll gimbal has a rotational freedom of ±20 degrees about its axis of rotation. Torque is supplied to each gimbal by a direct-drive D.-C. torque motor 144, 146, 148, and 150. The angular relationships between each pair of gimbals and between the outer roll gimbal 132 and the nosecone frame 142 are measured by single-speed inductosyns 152a, 154a, 156a, and 158a for a coarse indication and by multi-speed inductosyns 152b, 154b, 156b, and 158b for a fine indication.

Three single-degree-of-freedom integrating gyro units 128x, 128y, and 128z are mounted on the stabilized platform, with their input axes aligned along orthogonal axes. Three single-degree-of-freedom PIGA units 130x, 130y, and 130z are similarly mounted on the platform.

Any angular motion of the stabilized platform about the $Z_p$ axis sensed by the $Z_p$ gyro 128z, or any command signal to the $Z_p$ gyro, may be converted to a proportional gyro output signal and fed through a preamplifier 160 and servo amplifier 162 to the yaw-gimbal torque motor 150 in order to drive the yaw gimbal 140 to null the $Z_p$ gyro output signal. This will provide a direct closed loop to control the stabilized platform 126 about the $Z_p$ axis.

Any angular motion of the stabilized platform 126 about X and Y axes, sensed by the $X_p$ and $Y_p$ gyro units 128x and 128y, or any command signals to the $X_p$ and $Y_p$ gyro units, are fed to the yaw-gimbal coordinate-transformation resolver 164, which proportions these signals according to the sine and the cosine of the angle between the yaw gimbal 140 and inner roll gimbal 138. The output signals from resolver 164 are then fed to the inner-roll gimbal servo amplifier 166 and pitch-gimbal servo amplifier 168 as indicated in FIG. 6, in order to drive the inner roll and pitch gimbals 138, 136 so as to null the output signals of the $X_p$ and $Y_p$ gyro units 128x, 128y. This closes the servo loops for the stabilized platform 126 about the $X_p$ and $Y_p$ axes. The signal resolution noted is required for the roll and pitch channels since, in general, these axes will not be coincident with any of the gyro input axes.

The purpose of the outer roll gimbal 132 is to keep the inner roll gimbal 138 perpendicular to the pitch gimbal 136 and thereby prevent gimbal lock when the pitch angle approaches 90 degrees. The servo loop for the outer roll gimbal 132 functions as a position servo. The angle between the inner roll gimbal 138 and pitch gimbal 136 is sensed by the inner-roll-gimbal inductosyn 156 and the inner-roll-gimbal resolver. This signal is fed through a resolver amplifier 170 and through the outer-roll-gimbal servo amplifier 172 which may include amplifiers and a shaping network to the outer-roll-gimbal torque motor 144 to drive the outer roll gimbal 132. The outer roll gimbal 132 is positioned until the inductosyn signals 156 are zero. Coordinate transformation to compensate for the angle between the outer roll and pitch gimbals 132, 136 is provided by the pitch-gimbal coordinate transformation resolver.

Any acceleration of the missile is sensed by the pendulous integrating gyro accelerometers (PIGA units) 130x, 130y, and 130z. A signal proportional to the acceleration along the input axis of a PIGA unit is fed by the signal generator of a pendulous integrating gyro (PIG), through a preamplifier and servo amplifier to a servo motor that drives the PIG unit about its input axis to null the PIG unit. Therefore, a closed servo loop is formed, and the velocity of the PIG unit about its input axis is proportional to the linear acceleration along the input axis of the PIGA. The angular displacement of the PIGA shaft, on which the PIG is mounted, is therefore proportional to the linear velocity along the PIGA input axis. This angular displacement may be sensed by an inductosyn and fed to the computer 118 in the form of sine and cosine signals.

The inductosyn output signals to the computer represent the instantaneous sine and cosine values of the PIGA shaft angle. This angle is proportional to the integral of the specific-force input.

In the pre-launch phase of operation, the inertial measurement unit 110 is used in a gyrocompassing, undamped Schuler-tuned mode of operation to provide vertical, position, velocity, and azimuth information. During this phase, the coordinate reference axes $X_p$, $Y_p$, $Z_p$ (see FIG. 6) of the space-stabilized platform are oriented so that the $Z_p$ axis is parallel to the Earth's polar axis. Therefore, the $X_p$ and $Y_p$ axes lie parallel to the equatorial plane.

Standard alignment procedures are used to erect the vertical and obtain the azimuth. Inasmuch as inertial navigation techniques involving Schuler-tuned operation are well documented in such reference works as "Inertial Guidance" by C. S. Draper, W. Wrigley, and J. Hovorka (Pergamon Press, 1960), no principles of operation concerning this subject are described. The transformation from the vertical and north coordinates, in which the alignment takes place, to the platform $X_p$, $Y_p$, and $Z_p$ coordinates is defined and processed in the computer.

To maintain the stable platform aligned to the vertical in an undamped Schuler-tuned system, the outputs from the accelerometer servo loops are fed through gyro torque amplifiers to the torque generators of the gyro units (see FIG. 6). When an accelerometer senses an acceleration, or mass-attraction input, the gyro unit (north gyro in this case) is torqued so that the platform vertical is turned toward the direction of the acceleration.

Any error introduced into the Schuler-tuned undamped vertical indicating loop will cause the platform to oscillate with a period of 84 minutes. Therefore, when the mobile system is parked, these oscillations are reduced to zero by the introduction of damping into the loop. This damping is accomplished within the computer 118. Previous damping would be convenient.

Just prior to launch, while the missile is still horizontal, the vertical is refined for ground operation. The IMU supplies position and velocity information to the computer 118 during the complete flight of the nosecone. Two industosyns are used on each gimbal to measure the gimbal angle: e.g., a single-speed inductosyn 158a and a 256-speed inductosyn 158b. An inductosyn is a highly accurate multipole resolver that has a pancake structure. Two signal outputs are provided by each inductosyn: one proportional to the sine, and the other proportional to the cosine, of the angle between the stator and the rotor. The inductosyn has an accuracy of two seconds of arc using a computer stored calibration, and is reliable under severe acceleration conditions. Developments have been made on the inductosyn so that the inductosyn pattern can be plated on any metal, thus removing practically all of the previous limitations in the use of the inductosyn that existed when the pattern was reproduced on glass discs. New techniques and special machinery for centering and aligning have been made to produce pre-aligned units. The gimbal torque motors, e.g. 150, used to drive the gimbals are D.-C. torquers that have an output torque proportional to the input current. They must develop sufficient torque to prevent gimbal lock during the reentry accelerations when reentry steering is used. These torque D.-C. motors are conventional torquers.

The gyro units 128 used in the gimbaled inertial measurement unit 110 are well-known fully-floated single-degree-of-freedom integrating gyro units. The accelerometers used in the gimbaled version of the inertial measurement unit 110 are pendulous integrating gyro accelerometers 130 (PIGA units). The pendulous integrating gyro unit (PIG) 176 is similar to the gyro units except that the rotor of the gyro motor is off-center from the gyro output axis (gimbal-float longitudinal axis) along the gyro-motor spin axis in order to provide a pendulous gimbal float. Any acceleration along the PIG input axis causes a torque about the PIG output axis. This is sensed by the PIG signal generator and fed through a servo amplifier to drive the servo motor. The servo motor rotates the PIG about its input axis to generate a gyroscopic torque sufficient to balance the torque that resulted from the acceleration. Therefore, the angular velocity of this PIG about its input axis is proportional to the acceleration. This velocity may be sensed by an inductosyn 184.

The pick-off device used on the accelerometers may be an inductosyn similar to the inductosyns used on the gimbals. To be consistent with the binary system of the digital computer, a 256-pole, 128-speed inductosyn is used in the accelerometers.

The gimbaled version of the inertial measurement unit 110 and the star-angle sensor 120 may be mounted symmetrically on the same base during manufacture. This feature will provide the utmost accuracy in the relationship of the two units and yield the utmost in system accuracy.

During the powered-flight phase, the orientation of the stable platform with respect to inertial space is held within ten seconds of arc. This is necessary to:

(a) Assure that the computations of velocity and distance are based on the correct coordinate reference frame; and (b) assure that the vertical reference associated with the missile launch site is retained for the launch-position correction, which is made after burnout with the aid of stellar information.

This required accuracy is achieved basically by virtue of the high-performance capability of the floated gyro units.

When a star sight is being made during the mid-course phase, the stable-platform orientation is held to within two seconds of arc. Since the nosecone is in a very low-gravity environment with small disturbance torques during free flight, the stable-platform deviation is well under two seconds of arc.

Because of the proximity of the target during the reentry phase, the stable-platform errors then are not as critical as during the powered-flight phase. However, a reasonable reference is maintained during the short period of high-acceleration (87 g's) environment encountered during the reentry phase if steering during that phase is required.

*The star-angle sensor*

The purpose of the star-angle sensor 120 is to provide the missile computer with star-angle data that it can then use in connection with other data to determine the correct orientation of the reference inertial coordinate frame and thereby accurately establish the launching position. The present section describes the star-angle sensor 120 and shows how it carries out its aforenoted function. In order to obtain the required star-angle data, sights must be made on two stars, preferably a pair whose lines of sight from the sensor are nearly at right angles to each other. In addition, the sensor must be able to sight on stars of +3.0 magnitude or brighter, in order to ensure that there will be an adequate number of navigation stars available for sights on any trajectory.

There are two basic types of star-angle sensors that might possibly be used to accomplish such sights: viz, a wide-field sensor, and a limited-field sensor.

The use of a large field of view, if satisfactory operation could be accomplished, would obviate the need for orienting the sensor toward the selected stars. The wide-field sensor would have to be designed to view a total field of 100 degrees, in order to encompass the two stars selected for the sights on a given trajectory. Because of the +3.0 magnitude or brighter requirement, however, the sensor's field of view would have to be gated so as to be sensitive only in the vicinity of the star being sighted on, in order to prevent sighting on some nearby star having a sufficient brightness magnitude to be picked up. This feature would be necessary since there are many regions of the celestial sphere for which a wide field of view of the star-angle sensor would contain a great number of stars having a magnitude of +3.0 and brighter. Unfortunately, a major complication stands in the way of the wide-field sensor. This stems from the high resolution required of a star-angle sensor. For example, a two-second resolution is required for certain applications. Such a resolution needs 1800 elements for each degree of the field, or a total of 180,000 elements for each coordinate. This number can be translated into 180,000 sensors for each edge of a mosaic, or $3.24 \times 10^{10}$ sensors, or otherwise into a television camera with an 180,000-line scan. These numbers appear to preclude any wide-field approach on the basis of any equipment that is either available or under development. Therefore, a limited-field star-angle sensor, with the attendant need for orienting it to look at a selected star, may be used.

One method to achieve the required orientation of the star-angle sensor consists of rigidly attaching the sensor to the base of the inertial measurement unit 110 in such a manner that, following second-stage separation, it can view the heavens from the rear of the nosecone. Use is then made of the reorientation capability of the nosecone to direct the sensor line of sight in turn toward each of the selected stars.

Alternative means considered for mounting the star-angle sensor consist of the following:

(1) A sensor mounted on the space-stabilized platform of gimbaled inertial measurement unit 110.

(2) A sensor mounted in its own gimbal system.

A system in which the star-angle sensor is mounted on the space-stabilized platform of a gimbaled inertial measurement unit would allow the star-angle sensor and the inertial measurement unit to be closely coordinated. As a result, no errors would be introduced by follow-up servos or the computation required for converting from inertial to star-angle sensor coordinates, since for this arrangement the two coordinate frames would be identical. This system involves three types of disadvantages, however. First, the inner gimbal of the platform would have to be rotated to correspond with the star coordinates. Because two widely separated stars have to be sighted, large rotations would be required of the space-stabilized platform. Since this platform is the master reference for all computations, such rotations would be undesirable. The second disadvantage lies in the problem of packaging such a mounting arrangement. A two-inch increase in the inner-gimbal diameter in order to accommodate mounting the star-angle sensor on the stabilized platform would increase the twelve-inch outer diameter by the same amount. This means that in order to contain an eight-cubic-inch star-angle sensor, the inner-gimbal volume would have to be increased by 500 cubic inches. Also, the star-angle sensor must have an unobstructed field of view, which introduces problems in the gimbal configuration. Special arrangements to overcome the optical problem would disturb the symmetry of the platform and degrade the performance of the inertial guidance system. Since the function of the star-angle sensor is to improve the primary inertial data, compromising this data in order to obtain improvement by star-sighting does not represent the optimum approach. Finally, with the sensor space-stabilized it becomes part of the gimbal system and must look out of the nosecone through a window which can compromise the operation of the reentry vehicle. Strapped-down IMU operation, which has advantages of its own is precluded with such an arrangement.

In the second alternative, the sensor would be mounted on its own separate gimbal system, whose mounting structure would be attached to the same rigid base that supports the gimbal system of the gimbaled inertial measurement unit. The stabilized platform's orientation could then remain fixed with respect to inertial space and the star-angle sensor could be independently positioned as desired. A two-axis star-angle sensing system could be used with computed coordinate transformation. This has two main advantages over platform mounting. First, the over-all size and weight is less. Second, the computation can be made in inertial-system coordinates, without altering the orientation of the space-stabilized platform. This allows the selected stars to be sighted without degrading the performance of the inertial guidance system. Difficulties associated with the separate-gimbal scheme lie in the precision required of the servos to position the sensor gimbals. These must be carefully designed to be as accurate as the star-angle sensor itself, in order to avoid intolerable errors. Rigidity of the gimbals must also be carefully considered. The separate gimbal system, while resulting in a small over-all guidance system than obtained with platform mounting, would still constitute a large part of the star-angle sensor.

Mounting the star-angle sensor rigidly on the nosecone is preferred because this configuration achieves the most compact type of star-angle sensor. Also, no additional nosecone complexity is required for precision alignment of the nosecone in space, since this capability must be provided anyway, in order to achieve vernier velocity correction and reentry angle alignment subsequently during the mid-course phase. This type of mounting does, however, require increased use of the jet-reaction control equipment, with an attendant slight increase in the fuel used for orientation purposes.

Several additional factors must be taken into account in the design of the star-angle sensor. The most important are the nature of the star as a light source and the environment in which the star-angle sensor is used. The star-angle sensor is not used until after second-stage separation, so that the star background is then outer space, which is completely non-radiating. This means that the difficult problem of sighting stars in the daylight is not present here. Furthermore, the high accelerations and vibrations associated with the powered-flight phase will have been completed prior to active operation of the star-angle sensor; this factor means that high-precision measurements can be achieved by the star-angle sensor. The star-angle sensor is sufficiently flexible to permit a satisfactory trade-off between the least possible weight of this device and the rigidity needed for protection against the high-g loads that occur during the powered-flight phase.

With these over-all considerations regarding the design of the star-angle sensor noted, more detailed aspects of the star-angle sensor will now be taken up. It is important to note that, unlike the other major components of the guidance and control system, the star-angle sensor design is independent of the type of inertial measurement unit that is employed.

As shown by FIGURE 1, the star-angle sensor is located just outside the rear bulkhead of the nosecone. The base of the sensor is secured to a mounting surface on the rear frame of the nosecone that is machined normal to the roll axis of the nosecone within very close tolerances. This surface establishes the sensor line of sight parallel to the plane of the yaw and pitch axes, once the optical axis of the star-angle sensor has been adjusted parallel to the mounting base of this unit. The line of sight may be made coincident with the yaw axis.

The locating shoulder (see FIG. 7) on the sensor's mounting surface serves as a pilot to keep the sensor centered on the rear frame of the nosecone. This in turn centers the senor with respect to the inertial meaurement unit 110 which is also mounted to the rear nosecone frame on the forward end of the rear bulkhead. This rigid coupling of the star-angle sensor to the inertial measurement unit 110 eliminates any of the errors that would otherwise be introduced by flexure in the nosecone structure. To assure the best coupling possible, the inertial measurement unit 110 and the star-angle senor may be manufactured and assembled in the same plant.

A second mounting surface, complete with pilot, may be placed on the opposite side of the sensor supporting frame. This surface will provide the means for mounting the velocity-correction jet nozzle 114 (see FIG. 1) of the orientation and trajectory control equipment 116. This nozzle is directed aft, along the nosecone roll axis.

Between the two mounting surfaces noted is the sensor cylinder, which is comprised of the supporting frame 186 of the sensor and two ends covers 188, 190. The cylinder, which is about 3¾ inches in diameter and 5¼ inches long, contains the optics, the detector that senses the presence of starlight, and the electronics required to amplify and modify the resulting signal. The basic frame may be constructed of titanium since it has approximately the same thermal coefficient of expansion as optical glass, which reduces defocusing to a minimum amount. In addition, titanium provides the required structural rigidity with minimum weight. The end covers may be of aluminum, for minimum weight.

The optics, the detector, and the electronics are all rigidly mounted to the supporting frame. A pressure-tight connecting plug located in the center of the main mounting base may be used to make the necessary electrical connections to the computer 118.

In manufacture, after the sensor components have been assembled to the supporting frame, the cylindrical end covers 190 are attached and sealed to the frame. A fitting on the side of the supporting frame enables the sensor to be evacuated and filled with a dry inert gas. This procedure prevents contamination of the optics by either condensation or dust particles.

The cover at the viewing end of the sensor contains a window 192. Shielding will be provided to protect this window from the separation blast that takes place at the termination of the second stage. Between the window and the right-angled prism 194 at the opposite end of the cylinder is a shutter 196 to shield the detector from possible exposure to sunlight. The shutter remains closed until the nosecone line of sight is directed toward a selected star. An "on-star" signal from the computer 118 then actuates the solenoid 198 which operates the shutter 196. This signal indicates that the computer 118 is prepared to receive the output signals from the star-angle sensor. The end of a star fix is signalled by the removal of this signal.

The major physical components of the star-angle sensor, all located inside the cylinder formed by the supporting frame 186 and the two end covers 188, 190 are as follows:

A. The optics.
B. The starlight detector.
C. The sensor electronics.

A. *The optics.*—The optics of the star-angle sensor constitute a compact, catadioptric optical system; that is, a system involving both the reflection and refraction of light. The sub-components of this system (see FIG. 7) comprise the following:

(a) An optic wedge 200 and associated wedge motor 202.
(b) A pair of correcting lenses 204.
(c) A primary mirror 206.
(d) A secondary mirror 208.
(e) Two right-angle prisms 194, and 210.
(f) A reticle 212.

The optic wedge 200 has a deviation angle of 90 minutes. This wedge is rotated at a speed of 6000 revolutions-per-minute by the wedge motor 202, which may be an eight-pole, hysteresis synchronous motor driven from a precision power supply having a frequency of 400 cycles-per-second ±0.01 percent. On the perimeter of the wedge is a reflecting reference marker that covers 180 degrees of the perimeter, and also a 500-cycle pattern for synchronizing the data-processing circuit.

B. *The starlight detector.*—This component is a highly sensitive detector of visible light. At present, a photomultiplier 214 is contemplated for use as the detector. As is subsequently discussed, however, satisfactory operation from other types of detectors can be expected within the next few years.

C. *The sensor electronics.*—These electronic components, used to amplify and modify the video signal produced by the detector, comprise (see FIG. 9) a parametric amplifier 216, a video amplifier 218, a comparator circuit 220, a 1.6 megacycle-per-second pump oscillator 222, a roll-reference sensor 224, a pitch-reference sensor 226, and a synchronizing sensor 228 for the pump oscillator 222. The two reference sensors 224 and 226 and the synchronizing sensor 228 are identical phototransistors. These three sensors, fixed with respect to the supporting frame 186 of the star-angle sensor, are located on the periphery of the optic wedge 200, as indicated in FIGURE 7. The other electronic components are all located within the bounds of the supporting frame 186 and end covers 188 and 190, in the several regions not required for the optics.

The optics, the detector, and the electronics will be described later in further detail.

The purpose of the star-angle sensor is to provide a means for determining the star-angle associated with each star sight and transmitting this information to the missile computer. The star-angle is the angle that the actual direction of the star selected for the star sight makes with respect to the direction in which the line of sight of the star-angle sensor is directed by the action of the jet-reaction equipment as commanded by the computer.

The star-angle is defined by two characteristics: the magnitude of the star angle and the orientation of the star angle. Since the line of sight of the star-angle sensor lies along the yaw-axis, it is convenient to determine the star angle in terms of two rotation components that are parallel to the roll and pitch axes, respectively.

In order to carry out the function just described, the star-angle sensor comprises three major functional components: the optical system, the starlight detector, and the sensor electronics.

Thus, the functional breakdown is seen to follow closely the physical-component breakdown just described. The remainder of the discussion on functional operation describes these functional components in greater detail and relates their individual operation to the over-all operation of the star-angle sensor.

The optical system selected for use in the star-angle sensor is a folded, catadioptric system of the Maksutov-Cassegrain type, having all spherical surfaces. It consists basically (see FIG. 7) of two meniscus correcting lenses 204 that form an optical corrector, a primary mirror 206, and a secondary mirror 208 that is cemented to the inner surface of the corrector. In front of the corrector 204, an achromatic wedge 200 rotates about the optical axis of the star-angle sensor. Following the arrangement just described is a pair of right-angle prisms 194, and 210, a glass reticle 212 having both opaque and transmitting sectors, and a field or collecting lens. (This field lens is not required when a photomultiplier type of detector is used.) The system described is designed to provide a star-angle range of ±30 minutes with respect to the sensor line of sight. This corresponds to ±30 nautical miles on the Earth's surface and represents the maximum positional ignorance at launch. The system could be easily redefined to give a range of ±60 nautical miles or perhaps ±120 nautical miles.

FIGURE 7 shows the passage through the optical system of two light rays from the selected star that lie in the plane of the cross section. As indicated, the light rays from the selected star first pass through the window 192 and the rotating wedge 200 (whose function will be subsequently described). They then pass through the optical corrector 204, which is designed to have suitable refraction to correct for the distortion introduced by the spherical primary and secondary mirrors. Following this, the rays are reflected from the primary mirror 206 onto the secondary mirror 208. The secondary mirror 208 then focuses all the light rays received by the star-angle sensor so that they converge on the reticle 212, after passing through the opening in the center of the primary mirror 206 and through the two right-angle prisms 104 and 210. The prism arrangement folds the light beams back in a 180-degree change of direction by a convenient arrangement that allows a compact design of the star-angle sensor. The primary and secondary mirrors 206 and 208, constitute the positive and negative components, respectively, of a telephoto imaging system which, together with the folded optical system design, allows the focal length required for the sensor to be contained in a small physical package.

The pattern of reticle 212 (see FIG. 8) contains two transmitting quadrants and two opaque or nontransmitting quadrants. The reticle, which has to have a diameter of at least 0.5 inch for accurate construction and alignment purposes, defines a 2.5-degree field of view across its diameter. When the focused light rays converge on a transmitting quadrant, they pass through the reticle and impinge on the photomultiplier detector 214, if this type of detector is used. If a solid-state sensor is used, the light rays diverge until they strike the field or collecting lens. This lens condenses the light passing through the reticle 212 on the detector 214. Thus, the field lens actually images the primary mirror, via the secondary mirror and the prisms, onto the detector.

Without the presence of the rotating wedge 200 at the front of the optical system, the star image focused on the reticle 212 would be fixed in position. The purpose of the rotating wedge 200 is to deviate the star image radially with respect to the optical axis of the sensor. The resulting interaction between the rotating, radially displaced star image and the fixed reticle pattern enables the detector to produce a pulse-width modulated signal that contains the necessary information on star-angle magnitude and direction.

FIGURE 8 shows the geometry associated with the reticle 212. The two-cycle reticle pattern has equal angular spacing for each of the four sectors in order to provide two transmitting quadrants and two opaque quadrants that alternate with one another. The reticle, which is located in the focal plane of the optical system, is oriented so that the center line of the transmitting portion of the reticle is parallel to the roll axis of the nosecone, while the center line of the opaque portion is parallel to the pitch axis of the nosecone. The construction describing may be modified for particular applications without effecting the operation of the unit.

The operation of the pulse-width modulating system can be described as follows. The rotation of the optic wedge 200 causes the star image to rotate in a circular path on the reticle 212. This path has a diameter that occupies 1.5 degrees of the total 2.5-degree field of view of the reticle. If the line of sight of the star-angle sensor is coincident with the optical axis of the sensor, then the center of the image circle lies at the center of the reticle, as shown in FIGURE 8a. If the line of sight to the star is not coincident, however, then the center of the image circle will be displaced with respect to the roll and pitch axes in the same way that the star-angle is oriented with respect to these axes. FIGURES 8b and 8c show image-circle positions for star-angle displacements that are parallel to the roll and pitch axes, respectively. If the star line of sight is at a star angle of 0.5 degree with respect to the sensor line of sight, then the star-image circle will be tangent to the reticle edge at a point corresponding to the orientation of the star angle with respect to the roll and pitch axes. This follows from the fact that the range of the star-angle sensor is ±0.5 degree with respect to its own line of sight, the diameter of the image circle is 1.5 degrees, and the diameter of the reticle is 2.5 degrees.

To the right of the image-circle plots given in FIGURE 8 is shown a plot of the associated detector output signal. This signal is constant in magnitude and sense as long as the star image is rotating over a transmitting sector of the reticle pattern and light rays can therefore pass through the reticle 212 to the detector 214. The detector output signal is zero, of course, as long as the star image is rotating over an opaque sector of the reticle pattern. The relationship between an image-circle position on the reticle pattern and the associated detector output signal can be readily established for each of the three simple cases shown in FIGURE 8, and then extended intuitively for other more general cases to give a qualitative picture of how the pulse-width modulating system functions. As can be seen from the plots of FIGURE 8, a uniform pulse pattern is produced when the star angle is zero. For a non-zero star angle, however, a nonuniform pulse pattern is produced that is unique for each combination of magnitude and orientation of the star angle.

Each portion of a pulse pattern can be identified with a particular sector of the associated reticle pattern in the manner shown in FIGURE 8. Examination of this figure shows that the width of that portion of the pulse pattern identified with the sector in which the star-image circle is centered, increases and decreases, respectively, as the magnitude of the star angle concerned increases and decreases. The width of that portion of the pattern identified with the opposite sector, on the other hand, decreases and increases, respectively, as the magnitude of the star angle concerned increases or decreases. For the simple cases portrayed in FIGURE 8, in which the star-image circle is either centered or has a zero displacement component along either the pitch axis or the roll axis, the widths of those portions of the pulse pattern identified with sectors associated with zero-displacement components remain relatively unchanged. For the general case, in which a star angle would have an arbitrary orientation with respect to the roll and pitch axes, the star-image circle would have both roll and pitch displacement components. The widths of all four portions of the pulse pattern, corresponding to the four sectors of the reticle pattern, would then be different. The portions of the pulse pattern having the wide widths (long pulse durations) would identify the directions of the displacement components of the star-image circle along the roll and pitch axes. The pulse durations would establish the magnitudes of the two displacement components. Since the location of the star-image circle on the reticle pattern defines the star angle itself, it can be seen how the pulse pattern uniquely defines the star angle.

Such is the nature of the pulse-width modulation obtained with the star-angle sensor. Information on how the pulse-width modulated signal is used in conjunction with the computer to extract the information contained therein is covered in subsequent paragraphs.

The function of the starlight detector 214 is to act in conjunction with the optical system of the star-angle sensor to produce pulse-width-modulated signals for use by the data-processing circuit of the guidance system. In order to do this, the starlight detector must operate on the light received from +3-magnitude stars. To determine the amount of light the detector would receive from such stars, analysis showed this quantity to be $3 \times 10^{-10}$ lumen. The analysis concerned took into account the effective 2-inch diameter of the optical aperture, the approximately 75 percent effective transmission of light through the optical system, and the fact that the selected stars are to be viewed from positions that are outside the earth's atmosphere. This latter consideration is important because the attenuation through the Earth's atmosphere corresponds to 0.5 magnitude. Consequently, a +3 magnitude measured at sea level corresponds approximately to a +2.5 magnitude measured outside the earth's atmosphere.

With starlight of only $3 \times 10^{-10}$ lumen available, the choice of a detector must be given careful consideration. An analysis based on the various sources of limiting noise (such as Johnson noise, photon fluctuations in the signal, and dark-current limitations) indicated that at the present time only a photomultiplier detector could be employed to detect +3-magnitude stars with a 2-inch optical aperture.

A rugged version of such a tube can be made and mounted properly to provide adequate reliability.

At present, a GaAs solid state detector could be used with a system slowed down to 10 cycles per second to detect +2-magnitude stars. However, the signal-to-noise ratio would be low. Consequently, the probability of detection would not be as high as it should be for the kind of mission under consideration.

Detector development based on P–N junctions is relatively recent and it is anticipated that satisfactory detectors of the solid-state type will be available soon.

Because it is smaller and more rugged than a photomultiplier tube, the photojunction detector may be used in the star-angle sensor, whereas the photomultiplier tube may be regarded as an alternative or back-up device.

In view of the minor change in circuitry and mechanics necessary to accommodate these two types of detectors, the system can readily be designed to accommodate both sensors.

In view of the low energy levels available in the output signals of each of the two detectors just noted, it is absolutely essential to minimize the impairment of the information contained therein by the addition of noise during the amplification process. In order that the limiting noise source will be in the detector, the preamplifier that is employed must be capable of amplifying signals whose orders of magnitude are that of Johnson noise and adding a minimum amount of noise from its own operation.

Since the star-angle sensor provides a digital output at a 100-cycle rate, the sensor will not be capable of integrating the error signals. The integration is therefore accomplished digitally in the system computer.

If a larger output signal is desired from the star-angle sensor, another method of measurement has been designed. The chief change is that the reticle 212, instead of having alternately clear and dark quadrants, should have four dark quadrants separated by clear slits. Onset of light transmission through each slit is used to initiate timing to determine one angular deviation (roll or pitch) while terminating timing to determine the other angular deviation (pitch or roll). Termination of transmission of light through the slit takes no part in the measurement, and is used only to reset the system ready for the light pulse from the next slit.

The orientation and trajectory control equipment

The orientation and trajectory control equipment 116 acts in response to steering signals that come from the missile computer 118 (see FIGURE 2). This computer control is exercised on the *missile* during the powered-flight phase of the ballistic trajectory, and on the *nosecone* during the mid-course phase and (for certain ballistic-missile applications) the reentry phase. That portion of the orientation and trajectory control equipment 116 used for control of the missile is termed the *missile flight-control equipment* 238. The portion that is used to control the nosecone is called the *nosecone control equipment* 122.

As has been noted previously, the inertial measurement unit 110 used in the guidance and control system might be either a gimbaled version or a strapped-down version.

If a gimbaled inertial measurement unit 110 is used in the guidance and control system, the missile flight-control equipment 238 is all of a conventional, commercially available type. This equipment comprises (see FIGURE 11) an autopilot 240, servo amplifiers 242, said thrust vector controls 244 (movable nozzles and their associated actuators) as required to control the pitch, yaw and roll of the missile during the powered-flight phase.

The rate-sensing elements of the autopilot 240 that is used for flight control during the powered-flight phase should be located at or near a node of the elastic deformation of the missile, in order to assure that no dynamic instabilities occur. For control of the first-and-second-stage rockets of a near-rigid ballistic missile (typified by a small solid-propellant vehicle), it may be feasible to utilize the three rate gyros of the autopilot in the nosecone control equipment 122. Otherwise, separate sets of rate-sensing elements must be provided for control of the first and second stages, as required by the particular ballistic-missile characteristics concerned.

If a strapped-down inertial measurement unit 110 is employed in the guidance and control system, the output signals from the gyros of the unit can be used directly for rate information, provided the elastic properties of the missile permit. As will be shown subsequently, this means that as far as the powered-flight phase is concerned the three rate gyros of the nosecone control equipment associated with a gimbaled inertial measurement unit 110 can be eliminated when the strapped-down version is used.

Since the autopilots 240, servo amplifiers 242, and thrust-vector controls 244 employed in the powered-flight phase are standard commercial items, no further physical description of this equipment will be made.

Jet-reaction-type equipment is used for controlling the orientation and velocity of the nosecone after its separation from the second-stage booster. No aerodynamic controls of any kind are employed since they would be ineffective outside the Earth's atmosphere and have been found to be more complicated than jet-reaction controls should control of the nosecone be desired following reentry into the atmosphere. However, the use of equipment such as inertia wheels appears to be feasible and may be considered within the scope of this system.

Orientation control of the nosecone requires relatively small amounts of thrust compared with the thrust needed for velocity correction, so that a propellant with only a relatively low specific impulse (pounds of thrust × time/pound of fuel expended) is acceptable. On the other hand, effective orientation control does require fast reaction rates; that is, the orientation-control equipment must possess the ability to turn the jets on and off so as to achieve a minimum lag between the time the control valves are actuated and the time the desired result is achieved. On the basis of these requirements, jet-reaction equipment of the cold-gas type has been selected for orientational control in all types of ballistic missile applications. This is because such equipment fulfills the aforenoted requirements with a lower over-all weight than any of the possible alternatives, such as hot-gas jet-reaction equipment of either the mono- or bi-propellant type, or inertia reaction wheels.

For correcting the velocity of the nosecone, on the other hand, a propellant with a relatively high specific impulse is required. Here, either mono- or bi-propellant hot-gas-type equipment can be effectively used. The choice depends upon the range for which a particular ballistic missile is designed to be used. Mono-propellant equipment has a lighter over-all weight at intercontinental ranges (2000 to 5500 nautical miles), while bi-propellant equipment has a lighter over-all weight at medium ranges (200 to 1500 nautical miles) under the "launch-in-ignorance" operating conditions for which the guidance and control system is designed. This situation stems from the following factors. In order to attain a correction of a given magnitude at impact, a greater velocity correction, and hence a greater amount of thrust for a fixed time of application, is required for a medium-range application than for an intercontinental-range application. This results from the fact that the shorter the range, the less time there is for the velocity correction to affect the trajectory path of the nosecone. The equipment needed with mono-propellant fuel, which is characterized by a lower specific impulse than bi-propellant fuel, weighs less than the equipment needed with bi-propellant fuel when only the relatively small velocity corrections associated with intercontinental ranges are required. As the magnitude of the velocity correction required increases, however, the weight of mono-propellant equipment increases to a greater degree than the weight of bi-propellant equipment. The result is that for the relatively high velocity corrections associated with medium ranges, bi-propellant equipment weighs less than mono-propellant equipment. Bi-propellant equipment has not, however, been ruled out for ICBM applications.

The basic components of typical jet-reaction equipment designed for use in a medium-range ballistic missile (MRBM) are shown schematically in FIGURE 13. These components include six attitude-control jet nozzles 246 arranged in opposing pairs, and a single velocity-correction jet nozzle 248 directed along the roll axis. Other designs may utilize multiple nozzle configurations to provide reentry steering. All nozzles may be located externally on the after end of the nosecone. The remaining components of the jet-reaction equipment comprise three fuel tanks 250 for the three types of propellant employed by the system, and the associated on-off valves 252, pressure regulators 254, proportional-solenoid-controlled valves 256, and fuel lines. Feeding computer signals to the on-off solenoids are a relay and amplifier 258 (see FIGURE 12). Providing control signals to the proportional solenoids, and completing the nosecone control equipment, is a conventional type of autopilot 260. This autopilot comprises three rate gyros 262 and the associated electronic equipment required for modification of the three output signals. The rate gyros form a package that is rigidly attached to the nosecone frame.

The parametric amplifier 216 is the preferred choice for the preamplifier (see FIG. 9).

The output signal from the parametric up-converter amplifier 216 is an amplitude-modulated signal in which the pump frequency provided by a pump oscillator 222 (see FIG. 9) serves as the carrier and the pulse-width-modulated input signal from the detector 214 provides the modulation. With the detector output applied to the parametric-amplifier 216 input circuit, the output of the parametric amplifier will be a series of finite pulse groups. The repetition rate within the group will be the frequency of the pump oscillator 222. Therefore, if one of these pulse groups is applied to a digital counter, the number of counts registered will be a measure of the pulse width concerned.

As indicated in the preceding paragraph, the application of the parametric preamplifier 216 in the star-angle sensor requires a source of high-frequency alternating voltage. This frequency must be a known multiple of the wedge rotational speed. To provide for this correlation, it is desirable to obtain a synchronized signal at the highest possible frequency from the wedge. This is accomplished by placing 500 reflecting and 500 nonreflecting stripes, in an alternating pattern, around the entire circumference of the optic wedge (see FIG. 9). The pump synchronizing sensor 228 views this pattern and produces a 50 kilocycles-per-second square-wave output. This 50-kc. signal passes through conventional comparator circuits 220 to stabilize the pump oscillator 222 so that a definite known relationship exists between one cycle of its output and a fixed incremental change of angle of the star-image circle in the plane of the reticle 212.

The pump frequency selected for the parametric amplifier 216 is 1.6 megacycles per second. This frequency is locked to the wedge rotation by dividing the 1.6-mc. pump-oscillator output frequency by 32 in divides 230 and comparing the resulting 50-kc. comparison signal with the 50-kc. synchronization signal from the wedge 200. A feedback signal from the output of the comparator 220 controls the pump-oscillator 222 frequency so that the required correlation is obtained.

Since the wedge rotates at 100 revolutions per second, one cycle of the pump oscillator 222 will correspond to $\frac{1}{16,000}$ of a complete revolution of a star image around the image circle, or about $4 \times 10^{-4}$ radian. This also means that 16,000 counts will correspond to one complete image circle.

The amplitude-modulated pulse signal from the parametric amplifier 216 is further amplified by a video amplifier 218 of the transistor type before being sent to the data-processing circuits of the missle computer 118.

The function of the special output circuits of the star-angle sensor is to assist the data-processing circuits of the missile computer 118 in converting the amplitude-modulated output signal available from the video-signal amplifiers 218 into a two-coordinate digital output. This output will be used by the missile computer 118 in determining the orientation error of the inertial reference axes. The data-processing performed on the amplitude-modulated output signal is, of course, accomplished in the digital missile computer 118. It is well to consider the nature of this computation at this point, however, in order to obtain a complete picture of the operation of the star-angle sensor. In this connection, reference should be made to the functional block diagram of FIGURE 9.

The star-angle sensor receives an "on-star" signal from the computer 118 at the time the nosecone has been oriented to view the selected navigation star. This signal actuates the solenoid 198 which operates shutter 196 in the optical system noted earlier and thereby informs the star-angle sensor that the computer is prepared to receive the required output signal from the sensor. The end of a star sight is signalled by the removal of this signal, which causes the shutter 196 to close.

Upon operation of the shutter 196, the starlight input from the selected star produces a video signal that is pulse-width modulated in accordance with the magnitude and orientation of the angle between the line of sight of the sensor and the line of sight to the star. If this signal is of sufficient magnitude to produce an accurate star sight, a "ready" signal is sent to the computer star angle sensor programmer 232 from the video amplifier 218 of the star-angle sensor to inform it that the information it will receive is reliable.

The computer data-processing circuits represented in FIGURE 9 must convert the amplitude-modulated output signal available from the star-angle sensor to a two-coordinate digital output. This is done with the aid of the roll and pitch reference sensors 234, 236, that are shown in FIGURE 9.

On the perimeter of the rotating optic wedge is located a reflecting reference marker 238, 180 degrees in duration, that is used to reflect a source of light into two phototransistors 224, 226, in order to produce the roll and pitch reference signals required for the data-processing circuits 234, 236, of the missile computer. The relationships between the roll and pitch reference signals and the video signal is shown in FIGURE 10. FIGURE 10b shows the roll reference signal, which is centered on the diameter of the image circle that is parallel to the pitch axis. It is positive when the star image is to the right of this reference diameter during the course of its movement around the image circle, and negative when the star image is to the left of the reference diameter. The pitch reference signal, see FIGURE 10c is a similar signal, centered on the diameter of the image circle parallel to the roll axis. It is positive when the star image is below this reference diameter, and negative when the star image is above it. Both of these signals are square waves with both the positive (up) time and the negative (down) time equal to $\frac{1}{200}$ of a second.

The relationship between the two reference signals and the video signal from the detector 214 is shown in FIGURE 10d. The output from the detector 214 is shown positive when the starlight is passed by the transmitting sectors of the reticle 212 and zero when blocked by the opaque sectors. The geometry of the wedge 200 and the reticle 212 is so chosen that, for any star position within the dynamic range of the instrument, the roll-reference-sensor 224 transitions from up to down and down to up always occur when the starlight is blocked. The corresponding transitions in the pitch reference sensor 226 always occur when the starlight is sensed by the detector 214.

The star-angle sensor thus provides three basic input signals to the computing circuits: the square-wave roll, and pitch reference signals and the series of high-frequency pulses that comprises the amplitude-modulated output signal. This latter signal is shown in FIGURE 10e. The high-frequency pulses represent the location of the center of the star-image circle in the plane of the reticle, which in turn defines the star angle. This location will be specified by the components along the two mutually orthogonal roll and pitch axes, R and P, and the plane of the reticle 212. Since the dynamic range of the instrument is only +0.5 degree, the approximation that the tangent of the angle is equal to the angle in radians is accurate to within about 0.01 percent. Hence, it is possible to assume that the displacements in the reticle 212 are directly proportional to the star's angular-position error with respect to the line of sight of the star-angle sensor.

The 6000-r.p.m. rotational speed of the wedge 200 provides an information rate of 100 per second. It is necessary, therefore, that the star image not shift during any one reading period by more than the maximum tolerable error of 2 seconds of arc. For this reason, the missile angular rotation rate is limited to $\frac{1}{20}$ of a degree per second.

The basic components of typical jet-reaction equipment designed for use in an intercontinental-range ballistic missile (ICBM) are essentially the same as those shown in FIGURE 13. The basic differences between the jet-reaction equipment used for MRBM applications and that used for ICBM applications consist of the fuel employed by the velocity-correction system, as already noted, and the use of either a swivelable velocity-correction jet nozzle 248 or multiple nozzles for ICBM applications, in order to accomplish the required trajectory correction following reentry into the Earth's atmosphere. During the mid-course phase, the nozzle may be maintained in a fixed orientation along the roll axis of the nosecone and reorientation of the nosecone will be achieved by the use of the attitude-control jet nozzles 246, as for the MRBM application just described. Inside the Earth's atmosphere, however, it is impracticable to reorient the nosecone with the attitude-control jet nozzles 246 to accomplish a change in trajectory. Hence, a swivelable velocity-correction jet nozzle 248 is employed, under the control of signals emanating from the computer 118.

The same remarks on the autopilot apply here as noted for the IRBM equipment of FIGURE 13, in connection with the particular version of inertial measurement unit 110 employed in the guidance and control system.

The functions of the missile flight-control equipment 238 during the powered-flight phase are to perform programmed turn maneuvers in accordance with steering signals from the computer 118, to stabilize the missile against aerodynamic interference torques and to perform commanded trajectory-correction maneuvers. Basic servo loops provide for control in pitch, yaw and roll via an orientation and angular-velocity feedback path, as shown in FIGURE 11.

After launch, the missile rises vertically for a few seconds. During this time, the missile is rotated about the roll axis until a pitch axis is established perpendicular to the reference trajectory plane, thus aligning the nozzles 246 of the control system with respect to the flight path. The maximum rotation required of the missile to accomplish this is 45 degrees. The missile is roll-stabilized throughout the remainder of the powered flight. Following the short vertical-ascent phase, which allows the missile to safely clear the launching area, the pitch orientation is varied according to a timed program that was calculated just prior to launch and stored in the missile computer 118.

This programmed turn maneuver causes the missile to fly a standard reference trajectory for the particular target under attack as closely as the control-system inaccuracies and the variations in thrust permit. The yaw steering signals are normally zero and the autopilot 240 maintains a constant yaw orientation. Programmed loop-gain changes are used to compensate for the changes in dynamic pressure and vehicle mass that take place during the course of the flight as the propellant burns.

During the latter portion of the powered-flight phase, after the missile has reached sufficient velocity for meaningful calculations to be made, the computer 118 provides steering signals based upon continuously updated trajectory computations. Yaw steering signals are applied to the autopilot 240 by the computer 118, to correct for deviations from the updated trajectory until the cutoff velocity is attained and separation of the nosecone from the second-stage booster takes place. Pitch control is programmed throughout.

The functions of the nosecone control equipment 122 are to stabilize the nosecone against angular rotations following its separation from the second-stage booster, to orient the nose cone for star-sighting, to provide vernier correction of the velocity vector, to orient the nosecone as required for reentry, and if required for a particular application, to provide steering and roll stabilization during the reentry phase. Jet-reaction equipment 264, such as shown in the schematic diagram of FIGURE 13 is used to accomplish these functions. Functional block diagrams representing the operation of such nosecone control equipment are shown in FIGURE 12 for operation with the gimbaled inertial measurement unit.

After second-stage separation, the jet-reaction equipment 264 in response to control signals from the computer 118 stops any tumbling angular velocity. Immediately following this, the equipment receives orientation command signals from the computer 118 and rotates the nosecone in yaw, pitch and roll as required to correctly position the star-angle sensor 120. In order to accomplish this, star locations in inertial space, which are stored in the computer 118, are compared with the orientation of the nosecone, as indicated by the outputs of the inertial measurement unit 110. Orientation command signals are then generated in the computer 118 to rotate the nosecone so that the star-angle sensor 120 points at the desired star.

Two star sights are required in order to establish the correct orientation of the reference inertial coordinate frame. The output signal of the star-angle sensor 120 is fed to the computer 118 after each star sight and an accurate launching-position and present-position determination is made by the computer 118 after the inertial-axes orientation error has been established. A velocity-vector correction that will cause the nosecone to impact at the desired target is then generated in the computer 118 and correction signals are sent to the nosecone control equipment 122 as indicated by FIGURE 12. This equipment responds by turning the nosecone in pitch, yaw and roll to the angular orientation required for operation of the velocity-correction jet nozzle 248. The nosecone can be oriented to any orientation in space required to accomplish the velocity correction. The required magnitude of the velocity change is obtained by a single velocity-correction jet nozzle 248. Finally, a third star sight is made in order to obtain data that will enable the computer 118 to ascertain whether or not the missile warhead can be safely armed.

As an example of how the nosecone reorientations and the velocity-correction are achieved, consider the control system shown schematically and functionally in FIGURES 13 and 12, respectively. For an ICBM application, the operation of the nosecone control equipment for reorientation and for velocity correction would be identical with that described in the following paragraphs for the MRBM example.

FIGURE 12 depicts the nosecone control equipment 122 that would be used in connection with a gimbaled inertial measurement unit 110. In such a system, the computer 118 receives the actual roll, yaw and pitch position angles from the inertial measurement unit 110. The rates of change of these angles with respect to time are provided by three separate rate gyros 262 that are rigidly fixed to the nosecone frame. The computer 118 provides error signals in roll, pitch, and yaw, based on the difference between the actual angles present and the angles required for the particular operation at hand. The error signal and the rate signal for each channel, roll, pitch, and yaw, are multiplied by gain, subtracted and amplified by the electronic circuits of the mixer and amplifier 266. The resultant signals are sent to the appropriate proportional solenoids 270, which actuate the proper valves 256 and nozzles 246 to give the required rotation of the nosecone. Operation of the controls may occur in either a sequential or combined manner, depending on the system design. As indicated by FIGURE 12, the servo loops for each channel are closed through the inertial measurement unit 110 and the rate-gyro package 262, both of which are rigidly attached to the frame of the nosecone.

The six-nozzle attitude-control arrangement 246 depicted in FIGURES 13 and 12 in controlled by three proportional solenoid valves 256a, 256c, and 256d. The system is put into operation (see FIGURE 13) by the opening of an on-off valve 252a that allows nitrogen under a pressure of 3000 p.s.i.a. to flow through a 50-p.s.i.a. pressure regulator 254a to the three controlled valves 256a, 256c, and 265d. For yaw control, the yaw valve 256a controls the flow of gas to one or the other of the two yaw nozzles 246a, 246b. For pitch control, both of the two pitch-and-roll valves 256c, 256d, direct the gas flow in the direction that will provide the required pitch torque; for roll control, on the other hand, the two pitch-and-roll valves 256c, 256d, direct the gas flow in opposite directions, in order to provide the roll torque required. Thus, the yaw nozzles 246a, 246b act singly, while the pitch-and-roll nozzles 246c, 246d, 246e and 246f act in pairs.

If a strapped-down inertial measurement unit were to be used in the guidance and control system, the angular-rate signals required would be obtained directly from this unit with no need for the special rate-gyro package shown in FIGURE 12.

The vernier-thrust system for velocity control is merely an on-off control system. As indicated by FIGURES 13 and 12, the system described uses a single nozzle 248 and a bi-propellant (nitrogen-tetroxide-hydrazine) for the propellant. The operation of the gas flow in this arrangement can be summarized as follows, with reference to the schematic diagram of FIGURE 13. Upon receipt of a start signal from the computer 118, the relay 258 shown in FIGURE 12 closes and the on-off solenoid-operated valve 256b to pressurize to 100 p.s.i.a. the two propellant tanks 250 used for velocity-magnitude correction. Simultaneously, the on-off solenoid-operated dual-propellant valve 256b at the thrust chamber of the velocity-correction nozzle 248 is opened and the flow of propellant to that nozzle begins. Ignition occurs in a hypergolic manner, that is, spontaneously on contact. Propellant flow is regulated by the tank pressure and by flow orifices in the propellant lines to give a chamber pressure of 50 p.s.i.a. Flexible bladders 272 are used in the tanks to separate the nitrogen and the velocity-correction propellants at all nosecone attitudes. At vernier-thrust chamber the high-pressure nitrogen valve 256b at the thrust chamber and the high-pressure nitrogen valve 252b are closed by control signals from the computer 118.

After the required velocity correction has been successfully applied as established by the inertial measurement unit 110 and the computer 118, a third star sight is made as part of the prearming safety-check routine. The nosecone then coasts until, prior to reentry, the computer 118 sends attitude-correction signals to the nosecone control equipment 122, which accordingly provides repositioning torques as required to orient the nosecone to the desired reentry attitude. The same equipment can be used to accomplish this as was used earlier to orient the nosecone for the two initial star sights, the subsequent velocity correction, and the final star sight for the safety-check routine.

For certain long-range ballistic-missile applications, control during the reentry phase of the trajectory is required in order to achieve the required accuracy at impact. The required control in roll, yaw and pitch can be obtained by means of the jet-reaction system represented in FIGURE 13, with a swivelable nozzle or a series of nozzles employed for the velocity-correction jet 248. During the mid-course phase, this nozzle remains fixed in position and operates like the nozzle described in the MRBM example. During the reentry phase, it deflects in accordance with control signals from the computer 118. This means for modifying the trajectory path following reentry is necessary because there is considerably greater resistance to change in direction while in the Earth's atmosphere than while outside this region. A movable vernier nozzle can be used to provide a much higher thrust than the attitude-control jets 246 for the purpose of changing the direction of flight during reentry. As noted, a mono-propellant fuel and associated equipment is used for ICBM applications, because of weight considerations.

For certain applications in which no correction of the descent trajectory during the reentry phase is required, it is desirable to provide spin stabilization to the nosecone by rotating the nosecone about its roll axis. This rotation can be readily provided by jet-reaction equipment 264 in response to control signals from the computer 118 or small aerodynamic fins.

The missile computer

The missile computer 118 is the data-processing component of the missile guidance and control system. The position that the computer occupies in the functional organization of the guidance and control system lies between the inertial measurement unit 110 and the star-angle sensor 120 on its input side and the orientation and trajectory control equipment 116 on its output side (see FIGURE 2).

The computer 118 receives the nose cone orientation angular velocity and linear-velocity signals from the inertial measurement unit 110 and the star-angle signals from the star-angle sensor 120. It then processes the data contained in these signals in accordance with programs and basic data stored in its own memory. As outputs, it generates velocity and orientation command signals for the orientation and trajectory control equipment 116. The computer 118 bears the responsibility for determining an optimum trajectory and guiding the nosecone through this desired trajectory, in order to provide impact on a predetermined target.

The requirements of accuracy, flexibility, size and weight have dictated the choice of an arithmetic, general-purpose digital computer as the computing device for the guidance and control system.

One basic design of the missile computer package is illustrated in FIGURE 14. This package consists of a lightweight magnesium base 274 and five stacked deck assemblies 276 together with modules 278 supported from the base by an arrangement of staggered structural spacers. The package forms a pie-shaped section of an annular ring that is designed to fit into the nosecone envelope surrounding the inertial measurement unit 110 (see FIGURE 1).

Five printed-circuit decks 276 are utilized in the computer package. Each printed-circuit deck may be fabricated from an epoxy fiberglass sheet. The deck both structurally supports and electrically interconnects the other computer components. Conductor patterns printed upon one surface of the deck provide the circuit interconnections between the modules 278, the encapsulated units 280 and the magnetic-core storage unit 282. The conductor patterns may be augmented by built-up, fully-welded, plastic-insulated wire matrices added layer-by-layer, as needed.

The missile computer 118 has been designed as a synchronous, modified-serial, stored-program general-purpose digital computer. All numerical data is represented in pure binary code with a fixed binary point is a 28-bit word length.

Functionally, the computer is composed of five major sections; the input units 828 and output units 284, the memory unit 286, the arithmetic unit 288, the control unit 290 and the computer clock 292.

The functional organization of these sections is shown in FIGURE 15.

The computer must accept data from several sources during the course of a complete ballistic-missile mission (see FIGURE 2). For example, provision must be made to accept initial conditions and the computer program from external equipment prior to entering the prelaunch phase. The primary source of data over the entire mission is, of course, the inertial measurement unit 110. During the mid-course phase, the computer must also accept data from the star-angle sensor 120, for the purpose of establishing the inertial-axes orientation errors, prior to determining the required trajectory correction, and for determining whether or not missile operation is proceeding satisfactorily, so that the warhead can be armed.

Similarly, the computer must supply data to other components during the course of the mission. First, the computer must supply data to the missile flight-control equipment 238 for powered-flight trajectory control, then to the booster thrust control system 294 for main-thrust termination, and finally to the nosecone control equipment 122 for nosecone orientation and velocity correction in the mid-course phase (and also in the reentry phase for some ballastic-missile applications).

All inputs to the digital computer proper 295 (see FIGURE 15) and outputs from the digital computer proper will be in binary-code form representative of analog values. Except for the initial conditions and the computer program, which will be generated in binary form by ground-based equipment and read into the missile computer and the PIGA's, all inputs and outputs must be finally represented in analog form in the other components of the guidance and control system. However, digital inputs and outputs may be used, if desired.

One gimbaled version of the inertial measurement unit 110 provides eighteen analog-voltage signals representative of the sine and cosine functions from nine angular transducers. Six of these transducers are located in the gimbal system (see FIGURE 6), to provide measurement of nosecone roll, pitch and yaw; a fine angular-measurement device in the form of an inductosyn, and a coarse angular-measurement device in the form of a resolver, are required for each channel, to provide angular representation of the accuracy required for positioning the star-angle sensor 120. The remaining three transducers are located in the three pendulous integrating gyro accelerometers 130 (PIGA units) to measure PIGA-shaft angular displacements, which represent linear-velocity components The analog voltages are sampled simultaneously and held in an analog holding circuit for the duration of one computation cycle, after which a new sampling is made. Each analog voltage is individually converted to binary representation in a time-shared analog-to-digital converter 294. The binary signals are transferred to the digital computer proper 295 as they are converted. Here, they are accepted by a static input register 296 (one of the input registers represented functionally in FIGURE 15), and then transferred to the memory unit 286 for subsequent use by the computer.

The star-angle sensor 120 generates a digital pulse train that must be counted and stored in two separate counter input registers 234, 236 (FIGURE 9) under control of two attitude-reference signals. These will not be continuous counts and the registers accepting the pulse train will, therefore, be cleared to zero after each readout in preparation for the next pulse train.

A counter input register (not shown) is also required for time measurement. This register is pulsed by the computer clock and is sampled at commanded intervals, as required for computer computations.

All inputs are thus received in an analog-to-digital converter 294 and static input register 296 plus three counter input registers for the case of the gimbaled inertial measurement unit. Upon command from the stored program, the control unit of the computer will at any prescribed instant sample any one of the registers and store the result in the memory unit.

Six static output registers 304 with associated digital-to-analog conversion networks 306 and one output pulse circuit (not shown) are required for the computer output units.

The yaw and pitch commands used during the powered-flight phase are held in two static output registers for the duration of one computation cycle and are then replaced by an updated command based on the previously steering computation.

An output pulse is required for main thrust termination (see FIGURE 2). A pulse is generated in an output circuit when the trajectory equation is satisfied. This pulse effectively orders termination of thrust and initiates second-stage separation.

The nosecone system requires four static output registers for yaw, pitch, roll, and velocity-thrust control. These registers are updated at the end of each computation cycle for vernier control.

The computer design requires approximately 1900 words of storage, with each word consisting of 28 bits, 27 of which are for magnitude and one for sign indication. Thus, a total of 53,200 bits of information must be stored. A random-access magnetic-bore coincident-current memory-storage device has been chosen for the computer memory unit. Such memory units are well known and will not be further described.

The arithmetic unit 288 provides all the mathematical operations required by the computer. The operations programmed for the arithmetic unit include addition, subtraction, high-speed multiplication and division, an accurate high-speed square-root algorithm, and an integration-approximation routine.

The arithmetic unit contains shift registers for inputs and results, 19 basic full-serial adder circuits that can be gated with delay circuits into the proper configuration for the different mathematical operations, and logical circuitry to determine the algebraic sign of each result.

The control unit 290 of the computer is the functional combination of computer components that determines the sequence of operations to be performed and commands the other components to carry out the operations. Thus, the control unit of a stored-program computer has two parts. One part is represented by the program itself, which is stored as words in the memory unit, subject to call. The other part is represented by the registers that interpret the program words and the circuitry that interconnects and controls the other units.

The computer program is a sequential tabulation of computer commands. Each command or instruction is a coded binary word that identifies both the operation to be performed and the location in the memory unit of the word that is to be operated on. Thus, by arranging the computer commands in a suitable sequence, the computer may be made to perform any sequence of operations.

A high-frequency, oscillatory pulse generator with accurate frequency control is employed as the computer clock 292. The clock assembly consists of two parts: a crystal-controlled oscillator circuit and a pulse-shaping amplifier circuit (not shown).

The clock will operate at a selected frequency in the one-to-five megacycles per second range. Frequency stability will be maintained to within an accuracy of one part in 1,000,000.

The clock is used in a dual capacity. First, the computer has been designed for synchronous operation under control of the clock-pulse signals primarily for the purpose of performing integrations to high degrees of accuracy. Second, an accurate measurement of elapsed time is required for computational and operation-timing purposes, and this time measurement is made by counting the clock-pulse signals in a counter input register.

How the missile computer performs its functions during a complete ballistic-missile mission will not be described. This mission is considered to begin when the mobile ballistic-missile system starts out from a base of operations and to terminate when the nosecone impacts on the target. As noted previously, a complete ballistic-missile mission comprises four phases; the pre-launch phase, the powered-flight phase, the mid-course phase and the reentry phase.

The computer must function continuously during all four phases of operation. During the extent of each phase, the computer must perform a predetermined sequence of computations and must change to a new sequence of computations when a change from one phase to another occurs. The sequence of computations performed during each phase must be programmed to assure that the timing and accuracy requirements of the various operations are fulfilled.

The over-all sequency of operations is shown diagrammatically in FIGURE 16. This sequence of operations is independent of which version of the inertial measurement unit 110 is employed. However, the operational details, and consequently the timing required to perform the operations, does depend on which version is used. Read-in of information to the computer including the initial conditions stored, and the operations which take place during the pre-launch phase including present-position determination, target position determination, star-set selection, trajectory determination and vertical refinement, have been described previously, as have operations during the powered-flight phase, the mid-course phase and the reentry phase. These operations will not be described here.

Again it should be noted that the system described is specific to a mission in which a TEL is utilized and in which position at the point of launch is only approximately known. It is obvious that the system of this invention will apply whether the body be launched from the ground, water, space or from the surface of a planet. Other coordinate systems for defining position may be used for space or other applications. It is also obvious that, with minor modifications to the computer program, the system may be used with a maneuverable body whose launch position is known, but whose azimuth and vertical have been disturbed because of a nearby bomb blast. Such an operation has already been briefly described.

It is also obvious that by means of slight changes in the computer program, the system of this invention is capable of being effectively used for precise orbital injection, or for inter-planetary space applications. In addition, trajectory, as envisioned in this invention, may also mean orbital flight paths over an extended period of time.

With slight modifications, including the use of signal receiving apparatus, a missile or body may be launched without even an approximate indication of launch position. For such uses, it is only necessary that some positional indication be transmitted to the missile after launch. This could include transmitting both present and target position data to the missile some time after launch. Such uses require but slight modifications to the system, and will be readily apparent to those skilled in the art.

I claim:

1. A guidance and control system for a vehicle comprising
    means for producing signals indicative of launch parameters of vehicle launch position and vertical direction at the point of launch with respect to a coordinate reference system, one of said launch parameter signals being only approximately known within a predetermined error limit, the other said launch parameter signal being accurately known, said coordinate reference system having reference axes which are determined by said launch parameters,
    means for producing a signal indicative of the position of a target,
    inertial sensor means connected with said vehicle for producing signals indicative of vehicle acceleration and vehicle orientation,
    means for producing from said vehicle launch position signal and from said vehicle acceleration and orientation signals an approximate vehicle present position signal,
    means responsive to said approximate present position signal and said target position signal for producing a signal indicative of a reference flight trajectory to said target,
    guidance means for said vehicle,
    means for feeding said flight trajectory signal to said guidance means to guide said vehicle along said reference trajectory,
    a stellar sensor connected with said vehicle for viewing a stellar body and producing a stellar signal indicative of the orientation of said stellar body relative to the axes of said coordinate reference system,
    means responsive to said stellar signal for generating a plurality of direction cosine signals indicative of the orientation error in said coordinate reference system axes,
    means responsive to said direction cosine signals for determining an accurate value of said approximately known launch parameter signal,
    means for producing from said accurate launch parameter signals and from said vehicle orientation and acceleration signals a signal indicative of the actual present position of said vehicle,
    means responsive to said actual vehicle present position signal and said target position signal for producing an updated trajectory to said target,
    means for generating an error signal indicative of the deviation of said updated trajectory from said reference trajectory,
    and means feeding said trajectory error signal to said guidance means to correct the flight path of said vehicle toward said target.

2. A guidance and control system as in claim 1 in which said coordinate reference system is an inertial system fixed in inertial space.

3. A guidance and control system as in claim 1 and including;
    means for storing said vehicle acceleration signals during flight,
    means for correcting said vehicle acceleration signals in response to the accurate values of said vehicle launch parameters,
    means for integrating said corrected acceleration signals,
    and means for producing from said integrated acceleration signals and from said accurate launch position signal said vehicle actual present position signal.

4. A guidance and control system as in claim 1 and including means for directing said stellar sensor to view two stars, said stars being located substantially 90° apart in siderial hour angle.

5. A guidance and control system as in claim 1 in which said inertial sensor means includes a platform stabilized with respect to inertial space.

6. A guidance and control system as in claim 1 in which said stellar sensor has a sensor axis with a known orientation relative to said coordinate reference system, said stellar signal being indicative of the orientation of said stellar body relative to said sensor axis.

7. A guidance and control system for a maneuverable space vehicle comprising
    means for producing a signal indicative of vehicle position at the point of launch in an inertial coordinate reference system,
    means for determining an approximate value of vertical direction within a predetermined error limit at the point of launch in an inertial coordinate reference system and producing a signal indicative thereof, said inertial coordinate reference system having reference axes which are determined by said vehicle launch position signal and said vertical direction signal,
    inertial sensor means connected with said vehicle for producing signals indicative of vehicle acceleration and vehicle orientation,
    means for storing said vehicle acceleration signals,
    means for integrating said vehicle acceleration signals and combining said integrated signals and said vehicle orientation signals with said launch position signal to produce a signal indicative of vehicle present position, means for producing a signal representative of the position of a target, means responsive to said present position signal and said target position signal for producing a signal indicative of a reference flight trajectory for said vehicle to said target, guidance means responsive to said reference flight trajectory signal for directing said vehicle along said reference flight trajectory toward said target, stellar sensor means connected with said vehicle for viewing a stellar body and producing a stellar signal indicative of the orientation of said stellar body relative to the axes of said inertial coordinate reference system, means responsive to said stellar signal for generating a plurality of direction cosine signals indicative of the orientation error in said inertial coordinate reference system axes, means responsive to said direction cosine signals for determining an accurate value of said vertical direction signal, means responsive to said accurate vertical direction signal and said launch position signal for correcting said stored vehicle acceleration signals, means for integrating said corrected vehicle acceleration signals, means for producing from said integrated corrected vehicle acceleration signals and said vehicle launch position signal an updated vehicle present position signal, and means for correcting the vehicle flight trajectory in response to said updated vehicle present position signal.

8. A guidance and control system for a maneuverable space vehicle comprising means for producing a signal indicative of vertical direction in an inertial coordinate reference system at the point of launch of said vehicle, means for determining the approximate launch position of said vehicle within a predetermined error limit in an inertial coordinate reference system and producing a signal indicative thereof, said inertial coordinate reference system having reference axes which are determined by said vehicle launch position signal and said vertical direction signal, inertial sensor means connected with said vehicle for producing signals indicative of vehicle acceleration and vehicle orientation, means for storing said vehicle acceleration signals, means for integrating said vehicle acceleration signals and combining said integrated signals and said vehicle orientation signals with said approximate launch position signal for producing a signal indicative of approximate vehicle present position, means for producing a signal representative of the position of a target, means responsive to said approximate present position signal and said target position signal for producing a signal indicative of a reference flight trajectory for said vehicle to said target, guidance means responsive to said reference flight trajectory signal for directing said vehicle along said reference flight trajectory toward said target, stellar sensor means connected with said vehicle for viewing a stellar body and producing a stellar signal indicative of the orientation of said stellar body relative to the axes of said inertial coordinate reference system, means responsive to said stellar signal for generating a plurality of direction cosine signals indicative of the orientation error in said inertial coordinate reference system axes, means responsive to said direction cosine signals for determining an accurate value of said vehicle launch position signal, means responsive to said accurate vehicle launch position signal and said vertical direction signal for correcting said stored vehicle acceleration signals, means for integrating said corrected vehicle acceleration signals, means for producing from said integrated corrected vehicle acceleration signals and said accurate vehicle launch position signal an updated vehicle present position signal, and means for correcting the vehicle flight trajectory in response to said updated vehicle present position signal.

References Cited by the Examiner
UNITED STATES PATENTS

| | | | |
|---|---|---|---|
| 2,949,030 | 8/1960 | Horsfall et al. | 244—14.4 |
| 3,015,457 | 1/1962 | Dixson | 244—14.4 |
| 3,037,289 | 6/1962 | Garbarini et al. | 250—203 |
| 3,048,352 | 8/1962 | Hansen | 244—14 |

OTHER REFERENCES

Carroll: "Interplanetary Navigation by Optical Resection and Inertial Systems," Aero Space Engineering, vol. 18, No. 3, March 1959, pp. 53–55, 75.

Nichinson: "An Automatic Astro Compass," Navigation, vol. 6, No. 3, Autumn 1958, pp. 182–189.

BENJAMIN A. BORCHELT, *Primary Examiner.*

CHESTER L. JUSTUS, SAMUEL FEINBERG,
*Examiners.*

A. E. HALL, T. A. ROBINSON, M. F. HUBLER,
*Assistant Examiners.*